(12) United States Patent
Stata et al.

(10) Patent No.: US 7,849,063 B2
(45) Date of Patent: Dec. 7, 2010

(54) SYSTEMS AND METHODS FOR INDEXING CONTENT FOR FAST AND SCALABLE RETRIEVAL

(75) Inventors: Raymond P. Stata, Palo Alto, CA (US); Patrick David Hunt, Palo Alto, CA (US); Thiruvalluvan Mg, Chennai (IN)

(73) Assignee: Yahoo! Inc., Sunnyvale, CA (US)

( * ) Notice: Subject to any disclaimer, the term of this patent is extended or adjusted under 35 U.S.C. 154(b) by 345 days.

(21) Appl. No.: 10/966,566

(22) Filed: Oct. 15, 2004

(65) Prior Publication Data

US 2005/0198076 A1    Sep. 8, 2005

Related U.S. Application Data

(60) Provisional application No. 60/512,066, filed on Oct. 17, 2003.

(51) Int. Cl.
    *G06F 7/00*    (2006.01)
(52) U.S. Cl. .................................... 707/696; 707/742
(58) Field of Classification Search ........................ None
    See application file for complete search history.

(56) References Cited

U.S. PATENT DOCUMENTS

| | | | | |
|---|---|---|---|---|
| 5,685,003 A | * | 11/1997 | Peltonen et al. | 715/202 |
| 5,701,469 A | | 12/1997 | Brandli et al. | |
| 5,832,476 A | * | 11/1998 | Tada et al. | 707/2 |
| 5,845,278 A | * | 12/1998 | Kirsch et al. | 707/688 |
| 5,878,410 A | | 3/1999 | Zbikowski et al. | |
| 5,915,249 A | * | 6/1999 | Spencer | 707/742 |
| 5,920,854 A | * | 7/1999 | Kirsch et al. | 707/3 |
| 6,061,678 A | | 5/2000 | Klein et al. | |
| 6,061,692 A | * | 5/2000 | Thomas et al. | 707/200 |
| 6,078,924 A | * | 6/2000 | Ainsbury et al. | 707/101 |
| 6,327,574 B1 | * | 12/2001 | Kramer et al. | 705/14 |
| 6,353,925 B1 | * | 3/2002 | Stata et al. | 717/112 |
| 6,480,835 B1 | | 11/2002 | Light | |
| 6,502,095 B2 | | 12/2002 | Breitbart et al. | |
| 6,598,051 B1 | * | 7/2003 | Wiener et al. | 707/100 |

(Continued)

OTHER PUBLICATIONS

Tomasie, Anthony, Hector Garia-Molina and Kurt Shoens. Incremental Updates of Inverted Lists for Text Document Retieval, SIGMOD 94-5/94, pp. 289-300 (1994).*

(Continued)

*Primary Examiner*—Neveen Abel Jalil
*Assistant Examiner*—Christyann R Pulliam
(74) *Attorney, Agent, or Firm*—Hickman Palermo Truong & Becker LLP

(57) ABSTRACT

Systems and methods for query processing and indexing of documents in connection with a content store in a computing system are provided. In various embodiments, an indexing model is provided that is optimized for fast, efficient and scalable retrieval of documents satisfying a query, including the mixed use of forward and inverted indexing representations, including algorithms for achieving a balance between the two representations. When processing queries, fast and efficient generation of reverse chronologically ordered posting lists is enabled for efficient execution of logical operators on query result sets. A term expand index is also provided wherein the overall terms included in the term expand index are decomposed into a plurality of lexicon files, which are combined when convenient for fast, scalable efficiency when performing queries of the content in the content store.

35 Claims, 11 Drawing Sheets

U.S. PATENT DOCUMENTS

| | | | |
|---|---|---|---|
| 6,654,734 B1* | 11/2003 | Mani et al. | 707/2 |
| 6,658,423 B1 | 12/2003 | Pugh et al. | |
| 6,701,359 B1* | 3/2004 | Calabrez et al. | 709/223 |
| 6,725,227 B1* | 4/2004 | Li | 707/102 |
| 6,826,566 B2 | 11/2004 | Lewak et al. | |
| 7,064,688 B2 | 6/2006 | Collins et al. | |
| 7,149,748 B1 | 12/2006 | Stephan | |
| 7,185,019 B2* | 2/2007 | Nayak | 707/690 |
| 7,305,381 B1 | 12/2007 | Poppink et al. | |
| 7,542,965 B2 | 6/2009 | Chau | |
| 2001/0054073 A1 | 12/2001 | Ruppert et al. | |
| 2002/0143755 A1 | 10/2002 | Wynblatt et al. | |
| 2002/0184380 A1* | 12/2002 | Weider et al. | 709/230 |
| 2003/0120647 A1* | 6/2003 | Aiken et al. | 707/3 |
| 2003/0191737 A1* | 10/2003 | Steele et al. | 707/1 |
| 2003/0229299 A1* | 12/2003 | Shimura et al. | 600/595 |
| 2003/0233224 A1* | 12/2003 | Marchisio et al. | 704/4 |
| 2004/0006456 A1* | 1/2004 | Loofbourrow et al. | 704/4 |
| 2004/0006555 A1* | 1/2004 | Yamamoto et al. | 707/1 |
| 2004/0015478 A1* | 1/2004 | Pauly | 707/1 |
| 2004/0034688 A1 | 2/2004 | Dunn | |
| 2004/0051812 A1* | 3/2004 | Hayward | 348/460 |
| 2004/0064442 A1* | 4/2004 | Popovitch | 707/3 |
| 2004/0073536 A1* | 4/2004 | Smith-Semedo et al. | 707/2 |
| 2004/0093328 A1* | 5/2004 | Damle | 707/3 |
| 2004/0143569 A1* | 7/2004 | Gross et al. | 707/3 |
| 2004/0153436 A1 | 8/2004 | Pope et al. | |
| 2004/0176940 A1* | 9/2004 | Bosshart et al. | 703/18 |
| 2004/0177061 A1* | 9/2004 | Xu et al. | 707/3 |
| 2004/0181511 A1* | 9/2004 | Xu et al. | 707/3 |
| 2004/0181607 A1* | 9/2004 | Xu et al. | 709/239 |
| 2004/0199530 A1* | 10/2004 | Avadhanam et al. | 707/100 |
| 2004/0202214 A1 | 10/2004 | Aronson et al. | |
| 2004/0205357 A1* | 10/2004 | Kuo et al. | 713/200 |
| 2004/0205473 A1* | 10/2004 | Fisher et al. | 715/500 |
| 2004/0205514 A1* | 10/2004 | Sommerer et al. | 715/501.1 |
| 2004/0220904 A1* | 11/2004 | Finlay et al. | 707/3 |
| 2005/0120004 A1* | 6/2005 | Stata et al. | 707/3 |
| 2005/0144241 A1 | 6/2005 | Stata et al. | |
| 2005/0198076 A1 | 9/2005 | Stata et al. | |
| 2007/0038449 A1 | 2/2007 | Coifman | |
| 2010/0145918 A1* | 6/2010 | Stata et al. | 707/696 |

OTHER PUBLICATIONS

Brin, Sergey and Lawrence Page, The anatomy of a large-scale hypertextual Web search engine. Computer Networks and ISDN Systems 30, pp. 107-117 (1998).*

Cardoza, Patricia, "Special Edition Using® Microsoft® Office Outlook® 2003", Que Publishing, retrieved from website: http://proquest.safaribooksonline.com/0789729563/, published Sep. 25, 2003, 22 pages.

Lippman, Stanley B., "C# Primer: A Practical Approach", Addison Wesley Professional, retrieved from website: http://proquest.safaribooksonline.com/0201729555/, published Dec. 10, 2001, 5 pages.

* cited by examiner

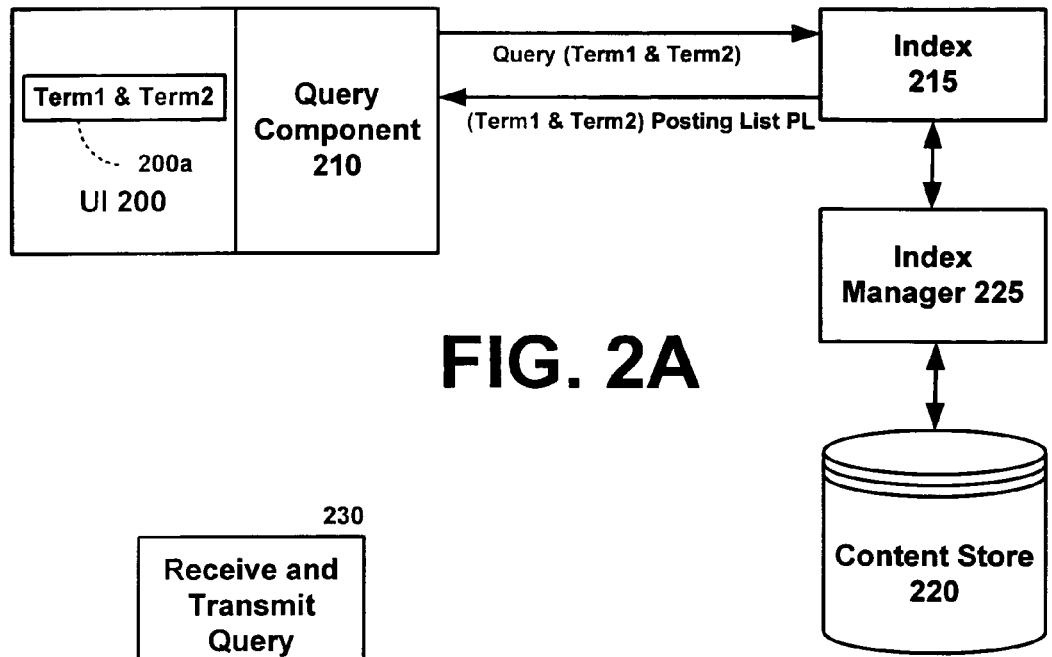
FIG. 2A
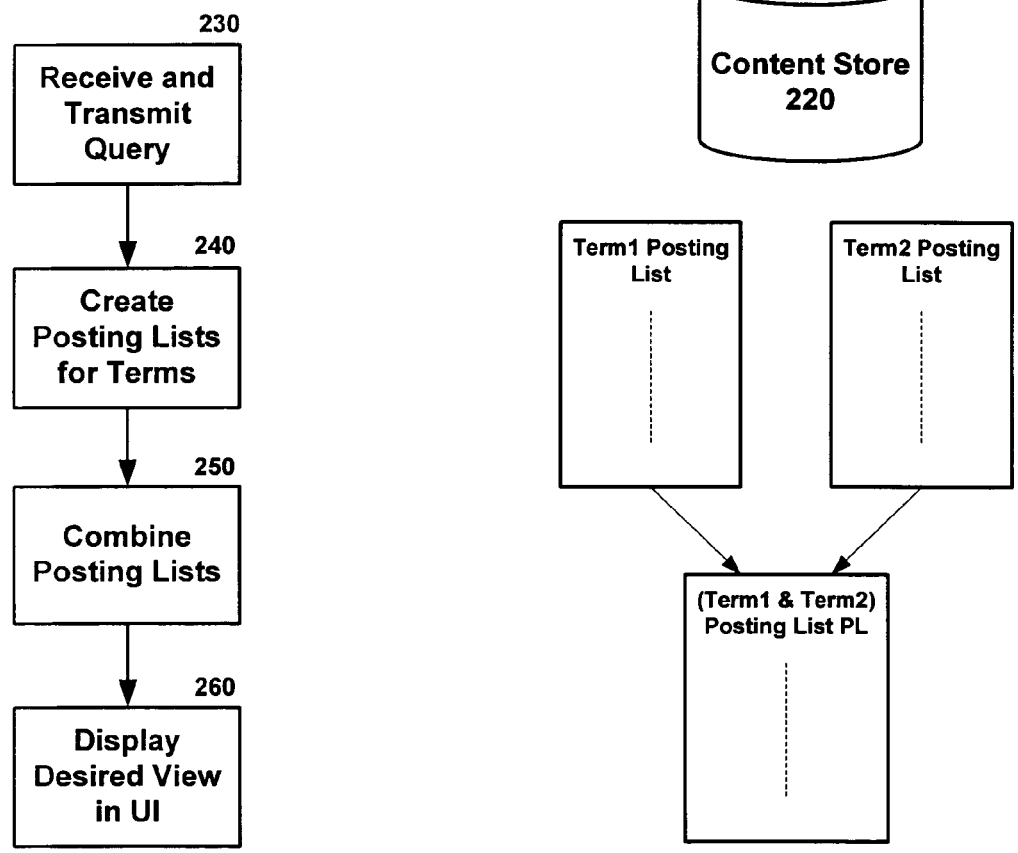
FIG. 2B  FIG. 2C

SYSTEMS AND METHODS FOR INDEXING CONTENT FOR FAST AND SCALABLE RETRIEVAL

CROSS-REFERENCE TO RELATED APPLICATION

This application relates to commonly assigned copending U.S. patent application Ser. No. 10/966,265, filed Oct. 15, 2004, entitled "SYSTEMS AND METHODS FOR INDEXING CONTENT FOR FAST AND SCALABLE RETRIEVAL".

FIELD OF THE INVENTION

The present invention is directed to systems and methods for fast, efficient and scalable retrieval of content from database(s). More particularly, the present invention is directed to fast, efficient and scalable systems and methods for indexing documents stored in a personal content database and processing queries on those documents.

BACKGROUND OF THE INVENTION

Continued growth in the sheer volume of personal digital content, together with a shift to multi-device personal computing environments, is inevitably leading to the development of Personal Content Databases (herein referred to as "PCDBs"), which make it easier for users to find, use and replicate large, heterogeneous repositories of personal content. An email repository is an example of a PCDB in today's terms in that users receive large volumes of messages and content in heterogeneous forms. For instance, the text included in the body of an email message may be formatted according to a variety of formats and styles. An email may include pictures, audio or video user interface (UI) controls, hyperlinks to other content. Moreover, just about any kind of content can be attached to an email message as a separate, but associated, object. To name a few, attachments may be images (such as jpeg files, .gif files, etc.), video (mpeg files, RealPlayer format, QuickTime format, macromedia flash objects, etc.), audio (.mp3 files, .wmv files, etc.), contact cards (e.g., v-cards), calendar objects (Sch+ objects), word processing documents (Word, WordPerfect, .pdf files), graphics files (Paint files, Visio files, etc.) and computer code (object files and source code). In essence, any object that can be created in a computing system can be shared via email, and thus, a user can appreciate that an email repository may serve as an example of the generalized notion of a PCDB. Defining the objectives and requirements for interacting with a PCDB is thus a useful step towards providing a system that, at a minimum, meet those objectives and requirements.

In this regard, end users are facing at least two main trends that are driving the development of these new types of "very large database(s)"—the proliferation of data and the proliferation of devices. With respect to the proliferation of data, as mentioned above, end users are facing an explosion of email, office documents, IM transcripts, photos, video content, music, and so on, and thus people need to manage an ever increasing number of digital items. In many respects, while the number of bytes representing the content can be a separate issue, the problem identified here is that the number of items is exploding, creating overwhelming manageability and organizational overhead. Traditionally, hierarchically organized sets of folders have been the primary means of managing these items; however, folders do not scale well, and for increasing numbers of users, this problem is reaching crisis proportions. To name just a few problems with folder structures, as the folder tree structure(s) becomes massive, there are too many branches to consider, and way too many leaves to uncover. In essence, folders merely save the problem for a different day because folders, by themselves, add to overhead and, over time, the folders may no longer have the same contextual relevance originally contemplated by the user. A folder only helps if the user remembers the folder and what is generally inside, and where to find it. Such folder memory is lost when the number of folders exceeds the average memory capabilities of the human mind.

Compounding the problem is the proliferation of devices. Given multiple desktops (home, office, etc.), PDAs, smart phones, the Internet, and even in-dash car computers, the increasing volume of personal content described above is necessarily being distributed over multiple devices. Currently, movement of personal data among these devices is painful, if possible at all, and users face a hodge podge of software and services for storing the volumes of data that result. Email, for example, is sometimes stored in specialized, local files (e.g., in personal information store, or .pst, files), sometimes on servers, and sometimes replicated on both. Some office documents are stored in the local file system, but a surprisingly large number of them are stored as attachments in one's email repository. Photos are often stored in the file system, possibly indexed by specialized software running beside the file system, and also possibly replicated to a Web server. Contact information, like email, might be stored in a specialized, local file and also synchronized out to a PDA and a phone. These various storage schemes do not interoperate, are all folder based, and are difficult to manage. Over time, interacting with content across device location(s) needs to become seamless if users are going to be able to fully utilize their digital content. Accordingly, new ways for searching for and retrieving desired content from PCDBs efficiently and in a scalable manner are desired.

To the extent that this hodge podge of storage systems will be replaced by a single PCDB, all of the user's personal data can be encompassed: email, documents, photos, even Web pages visited by the user, from wherever generated or found or from whichever device the data is retrieved. A hope is that associative retrieval, rather than folders, will be used as the primary means of organizing. Another hope is that the PCDB will transparently move content among a user's multiple devices, and the PCDBs of multiple users will share content with each other based on policies set by the user. While PCDBs will initially be small by VLDB standards—say, tens to small hundreds of gigabytes—current trends suggest that they will grow to terabytes, and thus another hope is that the computing systems and methods built around PCDBs will scale appropriately.

As an illustration of PCDB principles, email is the largest, fastest-growing, and most dynamic collection of documents managed by most users, and as described above, an email store is a microcosmic representation of a PCDB. Also, partly due to the difficulty of exchanging content among devices by comparison, email is becoming the primary gateway for bringing content into a personal environment, especially in a business setting. As an initial step in the building of robust, secure, and efficient PCDBs, therefore, it would be desirable to address current problems associated with the proliferation and retrieval of email. Searching and retrieving relevant content from a large scale email database becomes quite difficult and time consuming, and over time, as any high volume user of email recognizes, as more email is received and stored, the problem worsens. Accordingly, it would be desirable to provide a query execution model that addresses the need to search and retrieve the ever proliferating quantity of content that users receive via email.

In this regard, thanks to the success of Web search, users today can quickly understand applications that incorporate search as a user interface (UI) metaphor. If a service, such as a Web page, represents underlying content, for instance, the user quickly can appreciate that entering search terms in a UI control displayed on the Web site will retrieve content that is possibly relevant to those terms. However, with respect to email and the UI metaphor, the goals of Web and personal search tend to be quite different, and thus current UI controls and underlying algorithms for Web search are not suited to the problem of personal search. Scalable personal search is thus a difficult problem and for different reasons than those related to the Web.

For a brief explanation as to why, when considering only the search corpus, personal search seems much easier since the Web is vast, distributed and global whereas the desktop is local and finite. From a pure scale perspective, the Web is the harder problem, except personal search presents significant challenges in other ways that do not manifest with respect to Web search, including challenges with respect to: the activity associated with or goal(s) of the search, the computing environment, the interface and search dynamics.

First, it is easier to discover information than to recover an exact match based on incomplete information. The simple query "Aaron Burr," for instance, will yield thousands of documents about him on the Web. For the most part, information on the Internet wants to be found; it is intentionally, proactively—even aggressively—optimized for search engines results given knowledge of the underlying search algorithms. But recovery of personal information requires higher precision. There is typically only one right answer, one message or document (or version of the document!) for which the user is looking, and typically, what little metadata exists and is captured at the time an email message enters the store is not optimized for search and retrieval. Making matters worse, people typically adopt a steep discount function on time. This means users will not invest the time to organize up front (e.g., adding good associative metadata to the content)—nor should they, with the tsunami of digital information they face—so they invest it on the back end, with the expectation of a quick recovery process. Further, users know they once had the information, and so the process of looking for things can quickly feel redundant, frustrating and interminably time consuming.

When considering the computing environment, Web search engines are built from thousands to tens of thousands of dedicated machines. These machines are assigned specific tasks—some crawl, some index, some respond to queries. All the resources of a machine are dedicated to its respective one task. With personal machines, on the other hand, resources such as computing cycles, RAM, and I/O transactions are expected to be dedicated primarily to the user's foreground activity. When this expectation is violated, users quickly become impatient. Thus, with PCDBs, resources for indexing and disk structure maintenance must be borrowed from this primary use. In addition, Web search engines typically house their machines in dedicated host facilities with backup servers, restoration services, and redundant power supplies, whereas with personal devices, operating systems, memory configurations and hardware configurations tend to be all finely tuned for a specific set of applications in different ways from one another. The desktop is another world entirely—it's downright hostile. File scanners of various types can lock files for long periods of time, preventing even reads from occurring. Virus detectors and "garbage collectors" feel free to delete or otherwise "quarantine" files that are deemed dangerous or redundant. And of course, there are end users who are free to remove files and even entire directories they (mistakenly) deem to be unnecessary.

Additionally, the typical interface to Web search engines supports a single task: executing queries. PCDB interfaces, on the other hand, are embedded in applications that support multiple tasks. In email, for example, finding messages is one of many tasks; users also want to view messages (and, at times, avoid reading messages), create them, and even relate them to their on-going projects. Search can support many of these tasks, but only if the UI is redesigned around the search paradigm (rather than being relegated to a mere "fast find" dialog box).

With respect to dynamics, for the purposes of an individual query, content on the Web is static. Naturally, it changes over time, but the lifetime of a Web query is far shorter than the update cycle of the index. Personal content, on the other hand, is dynamic, in two directions. First, new information is constantly being added. Emails come in and go out at a dizzying pace. New documents are created and sent and received as attachments and moreover, all sorts of content can be downloaded from the Web. Second, the information itself is dynamic over time. Emails change state as they are read, annotated, altered, sent, and filed. Plus, capturing different versions of documents is essential to the flow of business. Business contracts, negotiations and agreements all have multiple versions and retrieving the correct version can have broad and deep financial implications. In a PCDB, the lifetime of queries far exceeds these changes. As a simple example in the context of email, when looking at the Inbox (an example of a view on a PCDB) in a search-based email client, one is looking at the output of a query: as new messages enter the system, this output needs to be updated accordingly. When keeping track of many views over the PCDB simultaneously, one can see that the problem compounds and becomes daunting.

In sum, the notion of a PCDB and associated software will evolve as a way to interact with content on many computing "personal" devices, including desktop and laptop computers as well as handheld devices. Relative to server computers, personal devices have less RAM, fewer disks, and otherwise have fewer resources. More importantly, personal devices are a shared (vs. dedicated) environment: the PCDB and associated application logic will run aside word processors, Web browsers, media players and other applications. When these other applications are in the foreground (i.e., when they are being actively used), the user expects them to operate unencumbered by the PCDB's background activities. Thus, a PCDB must find idle cycles to perform its background activities, it must be able to defer its background activities until there are idle cycles, and it must be able to suspend or abort background activities if they are started in an idle period, but are not finished when the machine becomes busy again.

It would thus be desirable to provide a query processing and document indexing model that addresses the above-described characteristics of a personal search of a PCDB, such as an email store. It would be further desirable to retrieve content from a PCDB based on a query in a fast, scalable, robust and efficient manner. It would be further desirable to implement posting list and term expansion systems and methods that are suitable for implementation in connection with the above-described characteristics of personal devices.

SUMMARY OF THE INVENTION

In view of the foregoing, the present invention is directed to systems and methods for query processing and indexing of documents in connection with a content store in a computing system. In various embodiments, an indexing model is provided that is optimized for fast, efficient and scalable retrieval of documents satisfying a query. Embodiments of the indexing model include combined use of forward and inverted indexing representations, including algorithms for achieving a balance between the two representations. When processing queries, the invention enables fast and efficient generation of reverse chronologically ordered posting lists for efficient execution of logical operators on query result sets. In other aspects of the invention, a term expand index is provided wherein the overall terms are decomposed into a plurality of lexicon files, which are combined when convenient for fast, scalable efficiency when creating a term expand index.

Other features and embodiments of the present invention are described below.

BRIEF DESCRIPTION OF THE DRAWINGS

The systems and methods for indexing and querying documents in accordance with the present invention are further described with reference to the accompanying drawings in which:

FIGS. 2A to 2F illustrate some exemplary non-limiting underlying techniques for querying a database and generating posting lists in accordance with various embodiments of the invention;

DETAILED DESCRIPTION OF ILLUSTRATIVE EMBODIMENTS

Overview

Figure 1A:
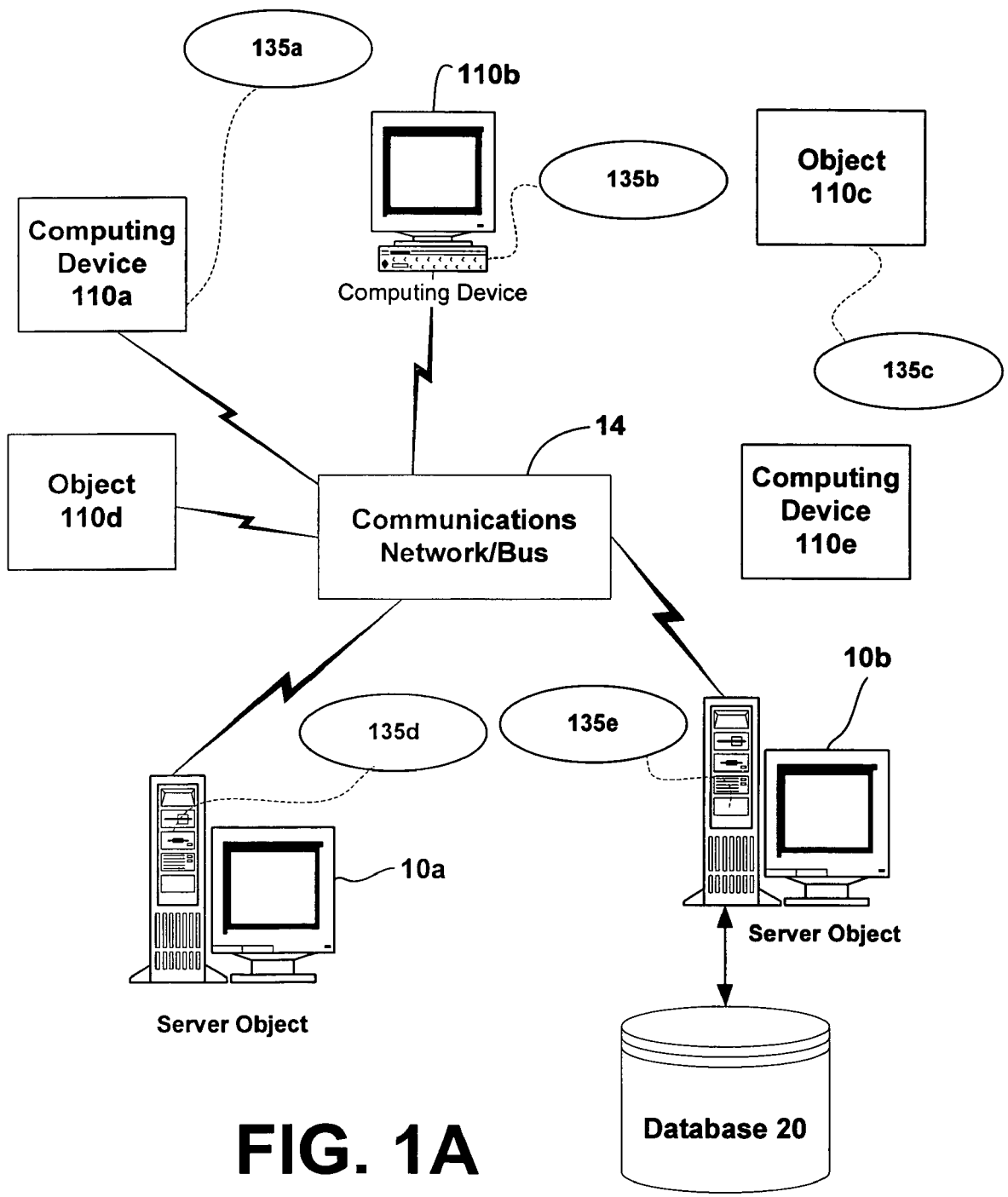
FIG. 1A is a block diagram representing an exemplary network environment having a variety of computing devices in which the present invention may be implemented.

The invention provides fast, efficient and scalable techniques for indexing and querying documents in a content store. In various embodiments, the invention provides systems and methods for generating and consuming posting lists in reverse chronological order. In one embodiment, for instance a timestamp for an incoming is used as the document identifier. In other embodiments, the invention provides a way to initially index incoming documents as forward representations, and over time, to convert sets of the forward representations to inverted representations, e.g., when convenient to do so in the system. Moreover, when the inverted representations become too numerous, they too can be combined in the background. Similar techniques are applied to a term expand index data structure whereby term expand lexicons are formed from a table representing new terms. If the table becomes too large, it is converted to a lexicon, and when the number of lexicons becomes too numerous, two or more lexicons are combined as a background process. Querying in accordance with the invention thus involves breaking a set of query terms into constituent query terms via the term expand index, querying the index of the invention to return reverse chronologically ordered posting lists that are efficiently combinable according to logical operators and using the results in connection with a desired application, such as email. These and other embodiments, and alternatives, are described below following a description of exemplary computing devices and environments in which the systems and methods of the invention may be practiced.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the indexing and query processing technique(s) according to the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the indexing and query processing technique(s) of the invention.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10a, 10b, etc. or 110a, 110b, 110c, etc. may contain an application that might make use of an API, or other object, software or hardware, to request use of the indexing and query processing technique(s) of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services and applications that use the indexing and query processing technique(s) in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the indexing and query processing technique(s) described herein is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI, for instance, are also digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of the indexing and query processing technique(s) in accordance with the present invention.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to interact with content in a data store to retrieve information.

In a network environment in which the communications network/bus 14 is the Internet, for example, the servers 10a, 10b, etc. can be Web servers with which clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 such as objects 135a, 135b, 135c, 135d, and 135e, and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing data (e.g., documents) indexed and queried according to the techniques of the invention. Thus, the present invention can be utilized in a computer network environment having client computers 110a, 110b, etc. that can access and interact with a computer network/bus 14 and server computers 10a, 10b, etc. that may interact with client computers 110a, 11Ob, etc. and other like devices, and databases 20.

Exemplary Computing Device

Figure 1B:
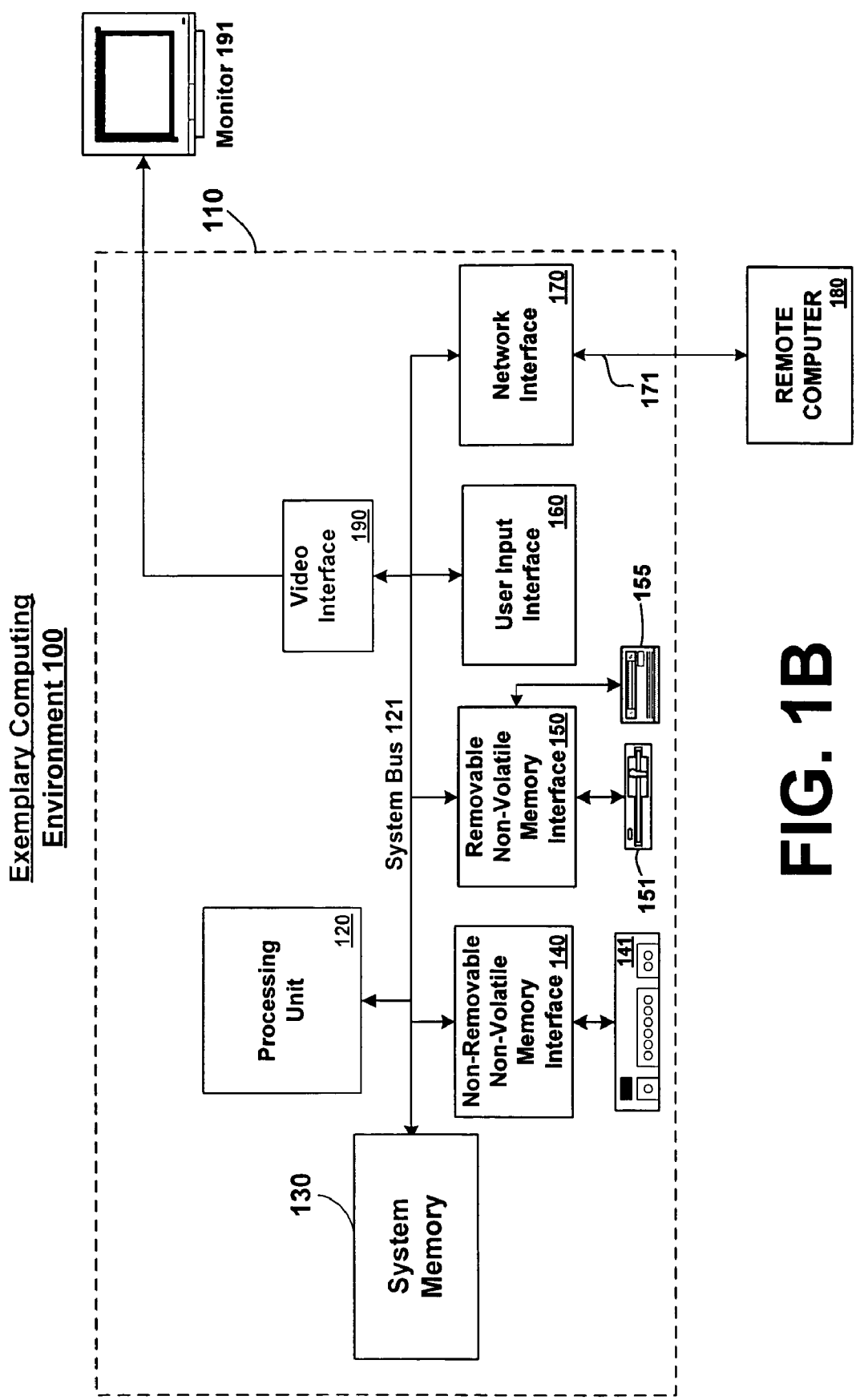
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client, or stripped down client such as a smart phone, having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that event data may be stored or from which event data may be retrieved, or where it is desirable to search and retrieve information, is a desirable, or suitable, environment for operation of the indexing and query processing technique(s) of the invention.

Although not required, the invention can be implemented via an operating system, for use by a developer of services for a device or object, and/or included within application software that operates in connection with indexing and query processing in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, described in more detail above, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

A user may enter commands and information into the computer 110 through input devices such as a keyboard or pointing device, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory. In addition to monitor 191, computers may also include other peripheral output devices such as speakers and a printer, which may be connected through an output peripheral interface.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk, and an optical disk drive 155 that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110. The logical connections depicted in FIG. 1B include a local area network (LAN) 171 via network interface 170, or alternatively a wide area network (WAN), but may also include other networks/buses. Such networking environments are commonplace in homes, offices, enterprise-wide computer networks, intranets and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, an exemplary distributed computing framework or platform includes servers, building-block services, such as Web-based data storage and downloadable device software. Generally speaking, a distributed computing framework provides (1) the ability to make an entire range of computing devices work together and to have user information automatically updated and synchronized in all of them, (2) increased interactive capability for Web sites, enabled by greater use of XML rather than HTML, (3) online services that feature customized access and delivery of products and services to the user from a central starting point for the management of various applications, such as e-mail, for example, or other software, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. In this regard, the indexing and query processing mechanism(s) and technique(s) of the invention may be provided as an integral part of such an application development framework, such that developers can easily include the mechanism(s) and technique(s) in new applications, and easily deliver the indexing and query processing services and associated UI mechanism(s) to end users as part of various services and applications, such as email, that may wish to perform operations in connection with indexing documents and/or processing queries on documents located in data store(s), wherever the underlying data is located.

Systems and Methods for Generating Posting Lists

Fast processing of full-text queries typically involves the use of a full-text index of the documents being searched. A full-text index for a document collection U has an entry called a posting list for each term appearing in U. A posting list is a sequence of entries called postings (a.k.a., "posting records") which describe occurrence(s) of a term in a document. To find the documents satisfying a query, a query component, or query engine, looks up the posting list of each of the terms in the query and combines those lists according to the operators in the query.

For example, imagine a user enters the simple query "zoology." In this case, the query engine would look up this term in the index and return each document found in the resulting posting list. If the user includes Boolean operators and, for instance, enters "zoology AND textbooks," the query engine looks up both posting lists and returns their intersection. If the user enters "zoology OR husbandry," the query engine looks up both posting lists and returns their union.

The execution of a simple query is illustrated in FIGS. 2A to 2C. As shown in FIG. 2A, an application or service may include a UI component 200 that includes a UI text box control 200a for receiving terms for a query against a content store 220, such as an email store. A query component 210 that handles the packaging, transmission, reception and processing of results (illustrated as a single integrated component although each function may be provided as separate objects, which need not be co-located) receives a query "Term1 & Term2" and performs the query against the content in data store 220. Typically, an index manager 225 prepares an index 215 in advance of the query, which facilitates the handling of the query by representing the content more efficiently. It is noted that a query can operate to examine document metadata as well as document content. For instance, a query may be associated with documents with a particular title, size, date, folder, etc., and index 215 may reflect such information.

Typically, then, as shown in FIG. 2B, after the query is received at 230, two posting lists are created at 240 in consultation with index 215, i.e., one for Term1 and one for Term2 of the query. At 250, the posting lists are combined to reflect only documents that contain both Term1 and Term2, as shown generally in FIG. 2C. With a list of documents, or document IDs, that satisfy the query as represented by posting list PL, and depending upon the view desired in connection with the application including UI 200, information about the documents may be displayed to the user. This might include the number of documents that satisfy the query and/or include the presentation of summary information, such as property information or other metadata, relating to the documents, or any other desirable view tailored to the posting list returned by the query engine. The list of documents need not be displayed at all, and can be used for other purposes. Thus, with a list of references to documents that satisfy the query, any use or any view of those documents may be achieved at 260.

In some systems, a posting record simply includes the identification of a document ("Doc ID"), or a reference to a Doc ID, containing the term. A posting record, however, may also include other field(s) that may be useful in examining the results of the query. For instance, in some systems, a posting record may include a Doc ID of a document satisfying the query term plus the count of occurrences of a term in that document to aid in certain forms of rankings. In others, a posting record may include the Doc ID plus a list of locations within that document where the term occurs to aid in highlighting the search terms in the result set. In essence, a posting record may include any arbitrary number of fields that may be relevant to the query being executed on behalf of the application receiving the results of the query.

Posting lists are typically stored on and accessed from disks, which are sequential-access devices. Thus, an issue with the design of full-text indexes is the order in which posting records are kept. Two different factors influence the ordering of these lists. One factor is support for combining posting lists. For example, if posting lists are sorted by Doc ID, then one can take the intersection of two posting lists by reading them sequentially, in parallel, and performing efficient combine operations, e.g., merge operations or intersect operations, on the lists. If they are not sorted, then taking an intersection involves reading the smaller one into RAM, which can be expensive from both a processing time and storage standpoint.

The other factor influencing the order of posting lists is ranking: if it is possible to rank documents heavily, or if it is possible to rank postings in a fashion that is highly correlated with the anticipated rank of documents, then ordering posting lists according to these ranking factors can aid in a so-called "top-N" queries in which the goal is to return only the N highest-ranked documents that satisfy the query—mainly because one or more analyses may be cut short once a certain level of confidence is achieved with respect to the documents that have been processed so far versus those that are not yet processed.

Thus, the particular form of a posting record in a posting list may take a variety of forms depending upon the application, and accordingly, while particular embodiments described herein may describe a posting list as a list of posting records including Doc IDs, it can be appreciated that the techniques of the invention may be applied to any implementation of a posting list including other fields as well.

As discussed, posting records may include a variety of information that may be tailored to the application(s) and resource(s) that use such posting records. In one aspect of the invention, it is recognized that certain forms of unique posting records can be generated that are more optimized for the problems associated with PCDBs described in the background than others. In this regard, while the invention in all of its embodiments and aspects is intended to apply to all varieties of posting lists, there are some specific varieties that are of particular interest in the context of PCDBs, such as an email store.

In this regard, a specific challenge recognized in connection with the invention is the challenge of efficiently and manageably keep posting lists in reverse-chronological order because such order enables efficient Boolean processing of posting lists and faster retrieval of the most relevant results. Where the posting lists are unordered, no interrelationships between the data in the lists can be leveraged when processing the lists. Moreover, where cache resources are limited for processing data, to build a posting list according to a Boolean operation between two unordered posting lists, at least one of the lists (usually selected to be the smaller of the two) will need to maintained in memory, which, as mentioned above, can be an expensive proposition depending upon the personal device. When one considers multiple query terms and multiple Boolean operators, one can see that such memory constraints can quickly become limiting upon the complexity of possible queries.

Figure 2D:
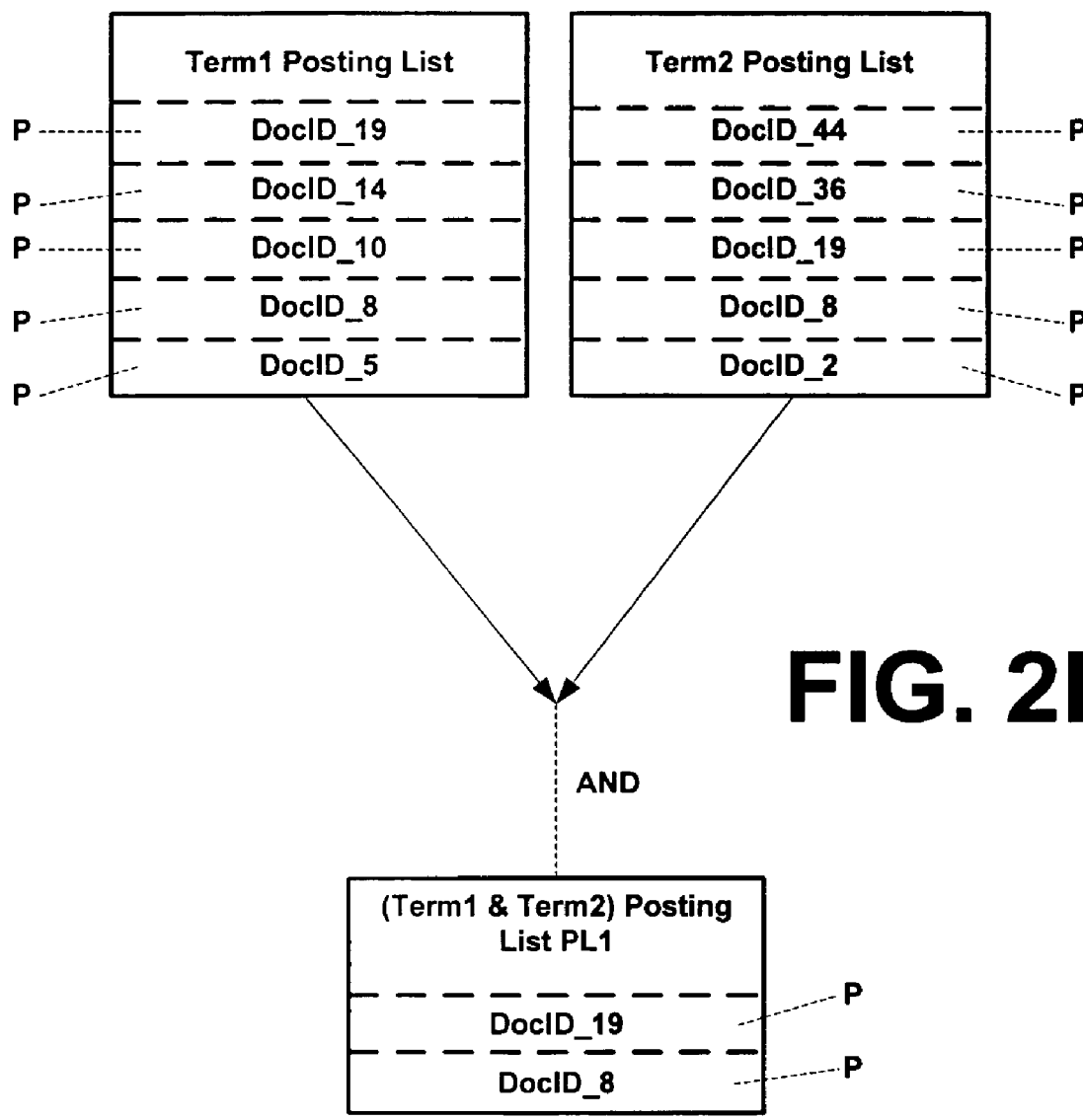

Building upon the sort illustration of FIG. 2C, the Boolean processing advantages gained from reverse chronological indexing posting records of posting lists according to the invention are illustrated in the example of FIG. 2D. In FIG. 2D, Term1 has returned a first posting list shown in the top left region of the drawing and Term2 has returned a second posting list shown in the top right region of the drawing. Each posting list includes a sequence of posting records P that are sorted so that they are ordered in reverse chronological order. Thus, in exemplary embodiments of the invention, at the front of these data structures are the Doc IDs (or references to Doc IDs) that represent the most recent documents in the system that satisfy the "term" query and at the end of these data structures are the Doc IDs that represent the oldest documents that satisfy the "term" query in the system. With an "AND" query wishing for the intersection of results between Term1 and Term2 as reflected in Posting List PL1, an efficient combine operation is now possible.

To perform the efficient combination of the two posting lists (i.e., end up with only posting records that are common between the lists), in exemplary algorithmic fashion, it is observed that DocID_5 and DocID_2 are at the head of the respective lists. Since DocID_2 is newer than DocID_5, DocID_2 may be discarded since it is known that there will be no DocIDs in the second list that are lower than DocID_5. Then, observing DocID_5 and DocID_8, respectively, in the first and second lists, the algorithm similarly discards DocID_5 as not satisfying the AND. Then, the algorithm observes a match for DocID_8, which is added to the resulting posting list PL. The algorithm continues according to this "back and forth walk" between the first and second posting lists until no more comparisons are to be made. While the Doc IDs used in this example are also expressed with ordered numbered references, this is by example only to illustrate the concept. The above-described procedure can be performed with temporal information alone (i.e., if the Doc IDs were all mixed up numerically). With a reverse-chronologically ordered set of random Doc IDs, again the first two documents listed would be compared in time. If there was not an exact time match between the documents, the documents are not the same, and the more recent of the two may be discarded, while retaining the older of the two for the next comparison. And so on. The inclusion of temporal information, such as date and/or time information, to achieve reverse-chronologically ordered posting lists is thus very useful when processing posting lists in accordance with the invention.

Similarly, efficient operations can be performed on the first and second lists for other logical or Boolean operators, such as OR, XOR, and combinations thereof, as well. It is also noted that since the posting lists that form the basis for these Boolean operations are ordered reverse chronologically, the posting list PL1 that results from this process is also ordered reverse chronologically. Thus, with reverse chronological ordering of the sequence of posting records in a posting list in accordance with the invention, efficient Boolean processing of posting lists may be achieved.

Moreover, for content where date is likely to be important in result sets, such as is often the case with email searches, reverse chronological ordering of posting records in a posting list enables the fast and efficient return of the most relevant results. For instance, generally, when a user performs an email search, a user generally knows something about the time period from which a particular desired result to retrieve based on a query originates. Thus, if a user believes that something occurred between one year and two years ago, for instance, a certain class of posting records in the posting lists for query terms can be immediately eliminated as being too old or too new. Moreover, by default, a user may wish to retrieve the most recent results that satisfy a particular query in order to have the most up to date information about that result set. A reverse chronologically indexed sorting list achieves this result naturally by presenting the most recent documents at the head of the data structure, and processing them first. In a system where it is desired to view partial results (more likely results) prior to being presented with the complete set of results (more and less likely results), a system that is able to hone in on the most likely results for satisfying a query is quite advantageous.

Thus, in various embodiments, the invention associates date information with posting records in order to receive, process, use and present posting records according to reverse chronological order. Accordingly, each posting record represented by a posting list in accordance with the invention includes temporal information about the document being represented, such as a transaction date and/or time associated with the document, so that posting list(s) of the invention can be sorted according to the temporal information, making processing of the posting lists more efficient.

The designation of posting records with "P" herein is to generically designate that posting lists in accordance with the various embodiments of the invention include posting records which can take on a variety of forms. Thus, in a particular described embodiment, the minimum fields of a posting record are illustrated inside a posting record P, but it should be understood that a variety of other fields may be included in a posting record P.

Figure 2E:
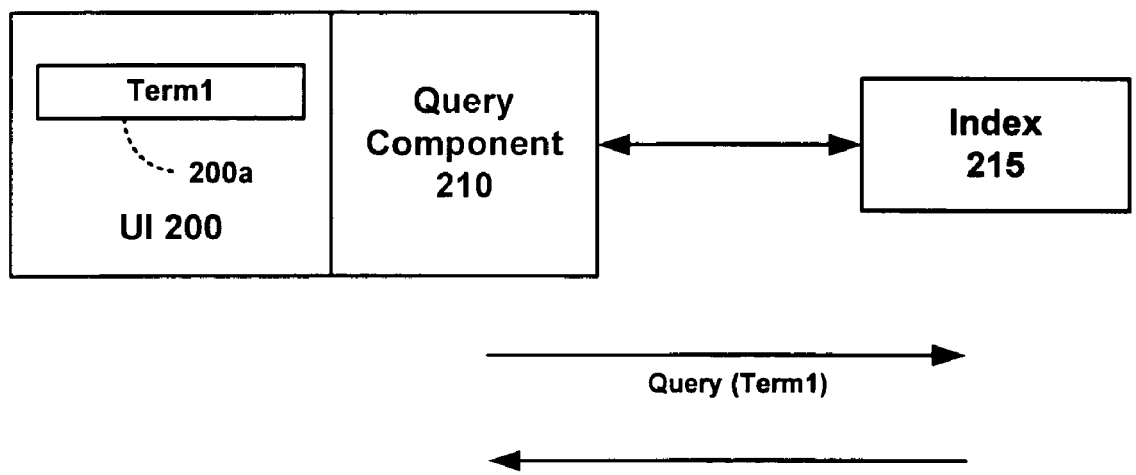

In other embodiments, as illustrated in FIG. 2E, the invention associates temporal information with posting records P of a posting list, PL2 by including a Doc ID and a document date (or other selected time granularity) with each posting record P. As illustrated, several documents may be associated with a single date as is often the case when multiple documents are created, received or otherwise transacted to a content store, such as a PCDB, on the same day. With these two fields, i.e., Doc ID and date, two sort keys may be maintained to sort a posting list efficiently: one for date and one for Doc ID. Each Doc ID can be guaranteed to be unique by a component that oversees the generation of new Doc IDs for new documents, e.g., by consulting a list of existing Doc IDs, or some other measure. Then, in accordance with an alternate embodiment of the invention, by sorting on the date of the documents to place the posting records in temporal order according to date and by sorting according to the Doc ID field to ensure order applies to documents having the same date, the above-described benefits of reverse chronological indexing can also be achieved. In exemplary algorithmic fashion, the first two posting records of the posting lists for an "AND" query are compared. If they are not the same date, then they are compared exactly as described above, discarding the more recent posting record. If the posting records include the same date field, then the Doc IDs are compared. Since the Doc IDs for each common date are ordered, the same procedure can now be followed for the Doc IDs, to determine if any posting records having the same date also have the same Doc ID. When the Doc ID analysis is complete for the date match, the analysis shifts back to comparing the next dates represented by the respective posting lists. The algorithm can be continued in like fashion until the desired query results are obtained.

It should be noted that posting records in accordance with the invention having the Doc ID and date field may also include, or be combined with, other fields for other purposes. For instance, the techniques of the invention can be extended to posting models that handle the location of an occurrence of a term in a document, or count of occurrences. With the temporal information embedded in the posting records P of the posting list, the posting records can be sorted or pre-sorted according to reverse chronological order to achieve the above-described advantages. Moreover, because posting lists are kept in reverse chronological order in accordance with the invention, the date field compresses well, e.g., using standard gap-encoding techniques. It is also noted that if Doc IDs are assigned in roughly chronological order, then they too compress well.

Figure 2F:
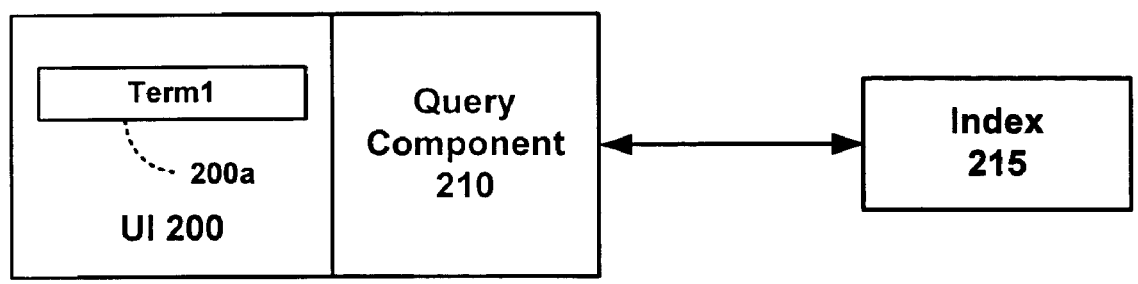
Figure 2F:
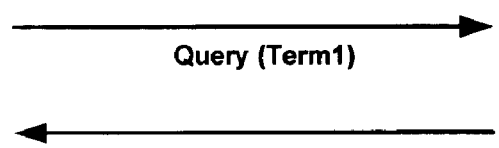
Figure 2F:
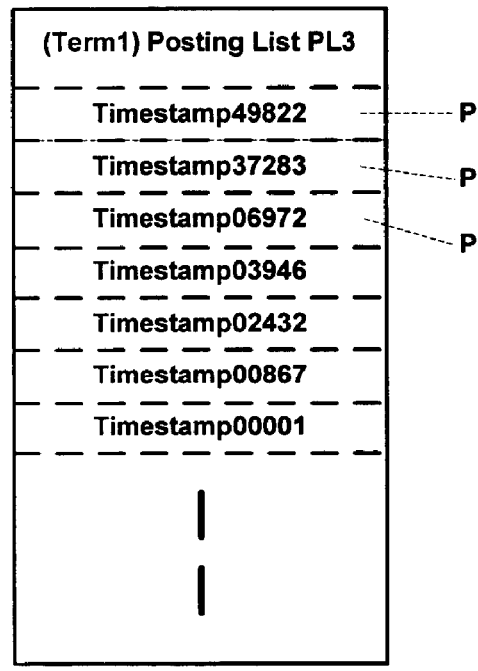

Further alternative ways to associate dates/times with posting records P in accordance with the invention include the use of timestamps as document identifiers, i.e., to conflate Doc ID and a time field from two fields to one field that serves both purposes. This approach has a number of benefits. First, the representations of posting records P of posting list PL3 are even more compact, because an entire field is eliminated from the posting record—which can be important for applications implicating limited memory. Second, because posting list PL3 is sorted by Doc ID, the efficient algorithms to combine posting lists (e.g., using ANDs, ORs, and NOTS) described in detail above can be utilized. This alternative embodiment of a reverse chronologically ordered posting list in accordance with the invention is illustrated in exemplary fashion in FIG. 2F. Using the same exemplary "Term 1" query, a posting list PL3 is returned that includes the Doc IDs (i.e. timestamps) in reverse chronological order. Posting list PL3 is now ready for efficient storage and compare/combine operations for a query or other use(s) specially suited to the processing of posting lists in reverse chronological order in accordance with the invention.

There is a complication arises from the use of timestamps as Doc IDs. Specifically, the complication is that Doc IDs should be unique for the most efficacious use of this embodiment of the invention, i.e., a given Doc ID cannot be shared by multiple documents or else an algorithmic ambiguity results from following the above-described compare/combine procedures. However, timestamps in general are not guaranteed to be unique. For a small sample of documents, it is likely to be true that timestamps for such small sample will be different (unique). However, for large numbers of documents as contemplated in connection with content stores, such as PCDBs, the law of strong numbers suggests a date/time collision will occur eventually.

Thus, the timestamps associated with documents are not necessarily unique since two or more documents could theoretically have the same timestamp. Hence, sorting documents by timestamps alone does not guarantee a unique ordering since for a list sorted by timestamps, two posting records representing documents with the same timestamp could be swapped, leading to a different list that is also sorted. Another way of stating this is that a list sorted by timestamps alone lacks "total order."

As used herein, an "ordering" of documents is a comparison function that indicates when one document is "ahead" of another. For example, comparing documents by Doc IDs is one way to order documents and comparing documents by timestamps is another. A "total ordering" is a particular kind of comparison function that generates unique sorts, i.e., for a sorted list under a total order, there is no way to permute the sorted list to generate a different list that's also sorted.

The optimized techniques for manipulating posting lists, such as those described above with respect to exemplary Boolean or combine operators, work best when the posting lists are sorted by total orders. The optimized techniques are also much easier to implement for total orders. Thus, in accordance with embodiments of the invention where it desirable to sort posting lists by timestamps and also use the optimized query techniques described herein, the invention finds a way to make the ordering total. Sorting by timestamp alone is not enough to impose a total order.

Various techniques are described below to extend timestamp order to a total order. For instance, one way described below is to enforce that every document does have a unique timestamp by "lying" about the timestamp wherever there is a conflict. Another way described below is to use another total order as a secondary sort key. Since Doc IDs are by definition unique, comparing them is a total order. Thus, if documents are ordered first by timestamp and, where timestamps tie, ordered second by Doc ID, then a total order is defined on the documents in a way that preserves timestamp order.

The invention thus contemplates a variety of techniques to ensure uniqueness of timestamps, e.g., where timestamps are used as Doc IDs, to rectify this complication without a superatomic clock that can guarantee uniqueness of timestamps. Although timestamps generally have precision down to the second for many computing applications, the techniques described here can be applied to any level of time granularity depending on the system. For instance, in an implementation of the invention that uses timestamps as Doc IDs, in accordance with one way illustrated in FIG. 3A, a table of all Doc IDs D currently in, or handed out, in the system can be maintained, so that a quick determination can be made whether a proposed new Doc ID has already been assigned. For instance, as illustrated, with a quick comparison against the Doc ID Table (which itself can be temporally, such as reverse chronologically, ordered), it can be quickly determined that proposed Timestamp49822 matches the existing Timestamp49822 in the table. One way the invention handles collisions such as these is to "tell a white lie," by adding a small amount of time to the timestamp and retesting the uniqueness. Since the reality of many systems is that timestamp collisions happen infrequently at the granularity of the system (since the granularity is usually selected with an appropriate balance between precision and practicality in mind), very few white lies are likely to result. Moreover, depending on the application, the small amount of time added in such cases is hardly significant. For example, a user will rarely care whether an email arrived at 1:04 pm and 43.038 seconds versus 1:04 pm and 43.039 seconds. Some would argue that even seconds represent precision beyond the care of users and/or accuracy of clocks providing the timestamps: thus, the same trick could be applied at the minute or even multi-minute level, if necessary to resolve a collision.

Figure 3A:
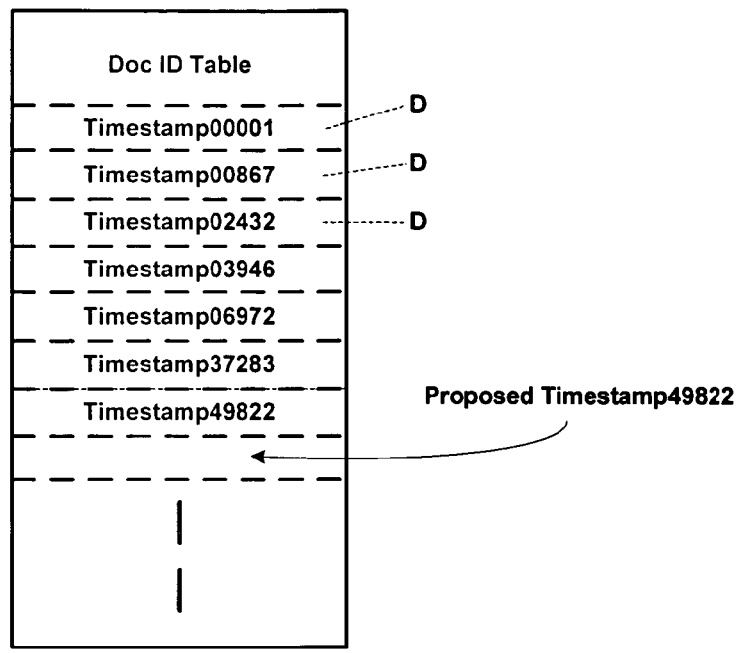
FIGS. 3A to 3B illustrate exemplary non-limiting use of a timestamp as a document identifier for posting lists generated in accordance with the present invention.
Figure 3B:
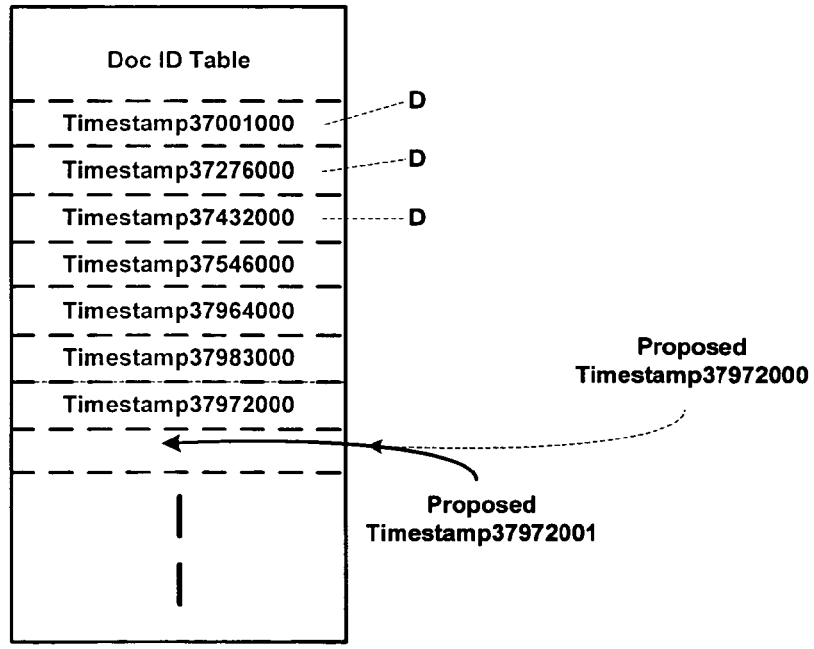

Another way to handle collisions where the proposed new Doc ID (timestamp) is the same as another Doc ID (timestamp) is illustrated in FIG. 3B. With this alternative technique, a number of bits of the Doc ID, e.g., a pre-defined number of least significant bits, normally zeroes though not required, can be reserved to resolve collisions. An exemplary system having timestamp Doc IDs with exemplary precision down to the millisecond is illustrated in FIG. 3B. From the standpoint of an application such as email that tracks the precision of a document to the second, one thousand documents with the same timestamp to the second can thus be assigned a unique Doc ID. Such is the case represented in FIG. 3B, where documents D being tracked in the system in the Doc ID table all arrived at the 37$^{th}$ second of some minute, but their arrival times differ by the microsecond as reflected by the next three numbers in the respective Doc IDs after 37. Then, in accordance with this embodiment of the invention, any number of bits can be added anywhere in the sequence according to known values (here three zero values at the end) to reserve bits for conflict resolution. Thus, for the first collision at timestamp 37972000, the invention "invents" precision by changing one of the bits reserved for collision in a way that preserves order. Thus, before being assigned in the system, the Doc ID is changed to 37972001. While Timestamp 37972001 may have arrived just before or just after Timestamp 37972000, the uniqueness conflict is resolved, and the assumption is that whether it is assumed one way or another for purposes of using query results, the level of precision at the "invented granularity" (here, microseconds) is unimportant.

Similar to the technique described with FIG. 3A, the level of precision and number of reserved bits can be balanced for the application. As discussed for email above, for instance, users may not really extract value from maintaining precision down to the seconds (esp. milliseconds or microseconds) for email.

In another embodiment of the invention that enforces uniqueness of timestamp Doc IDs, for every incoming document, it is first determined into which time bucket of a plurality of time buckets (exhausting coverage for all incoming documents) the document falls. Then, within each time bucket, uniqueness is guaranteed by maintaining a second field which, in effect, is fictional temporal precision for the timestamps. For instance, such a second field can be a sequence number, to resolve conflicts between timestamps. For example, the first timestamp in each bucket receives a sequence number of 0, the second timestamp in each bucket receives a sequence number of 1, the third timestamp in each bucket receives a sequence number of 2, and so on, wherein for each time bucket, information about the last sequence number handed out is stored so that the "next" sequence number can be handed out properly when the time comes. In such a system, one ensures that the granularity of time bucket that is selected reasonably works within the limit of sequence numbers that can be handed out. In exemplary implementation, timestamps may have precision to the second, and sequence numbers are handed out at the "millisecond" granularity, i.e., for every timestamp, there is tolerance for a thousand documents to have the same timestamp to the same second. One can also imagine a system that applies a third field on top of the second field to resolve conflicts at the second field level.

Additionally, time buckets can be maintained with less precision too, and still benefit from the use of sequence numbers. For time buckets maintained at the week granularity, for instance, a sequence number second field need only be used for those posting records that manifest a conflict. Thus, time buckets maintained for assigning timestamp Doc IDs in a unique manner can be tailored to the statistical characteristics of the incoming documents.

It is noted that there may be some reason why it is not convenient for these timestamp Doc IDs to be returned by the query processor (for example, because Doc IDs are assigned by an external system over which the indexer has no control or ability to cooperate). In such circumstances, the following embodiments of the invention maintain a mapping from the timestamp Doc IDs to the "external Doc IDs" (or vice versa) to allow the assignment of timestamp Doc IDs in posting lists, as described above, while still returning query results efficiently. Such external Doc IDs may be, for instance, a globally unique identifier (GUID) maintained by the storage system.

In one embodiment, such mapping is maintained by carrying both fields into the posting list from the system (and carrying them through the rest of the system, e.g., index sets, as necessary as well). Thus, in this embodiment, each posting record of the posting list includes both the internal Doc ID (e.g., timestamp used as a Doc ID as described above) and the external Doc ID (e.g., GUID). The posting list is then sorted by timestamp Doc ID, though as described above, the posting list could secondarily be sorted by Doc ID as one form of imposing total order.

In another embodiment, in addition to assigning timestamp Doc IDs to documents and generating posting lists as described above, for every document in a multiple document index (MDI), a table is separately maintained comprising timestamp Doc ID/external Doc ID pairs which can be consulted when generating posting lists to ensure that the information in the posting list is suited for the reason it is being generated, and thus may include one or both fields in the resulting posting list. Such a table can itself be temporally ordered for more efficient consultation of the table.

Moreover, the table can be maintained in the form of a special posting list that is sorted by timestamp Doc ID and then, a query can be processed using timestamp Doc IDs as described above; however, before returning results, the timestamp Doc ID result list is conjoined with this special posting list to extract the external Doc IDs corresponding to the timestamp Doc IDs found by the query processor. By controlling the output of the conjoining operation with the special posting list, a resulting posting list for a query term can optionally include posting records having the timestamp Doc ID/external Doc ID pairs, or just the timestamp Doc IDs, or just the external Doc IDs, depending upon the reason the posting list is being generated.

The techniques described can be applied to a variety of contexts including the system including single document indexes (SDIs) and/or multiple document indexes (MDIs) and related subject matter described in more detail below; however, it is the maintenance of the mapping from uncontrollably assigned Doc IDs to ones that can be maintained in reverse chronological order in accordance with the techniques of the invention that retains the advantages of the invention for such circumstances.

In sum, in various embodiments of the invention described above (and combinations thereof), an optimal ranking function for recall searches of personal content is reverse-chronological order: that is, of all documents matching the search criteria, return the newest first, then the next-newest, and so forth. Accordingly, in one embodiment, the invention maintains posting lists in reverse chronological order so that operations can be efficiently performed. Though reverse chronological order is listed herein in connection with various embodiments as an applicable ranking function for sorting a list of documents, it is noted herein that the techniques of the invention as applicable to time as a ranking function (e.g., reverse or forward chronological order) may be applied in alternative embodiments where other ranking function(s) are used as ranking function(s). Such alternative embodiments still gain the benefits of ordering of documents in connection with the index set and generation of posting lists in accordance with the invention, by taking advantage of underlying sort efficiencies in the same manner. For instance, with reverse chronologically ordered lists, searching can be terminated when the top-N results are found. For another example, keeping posting lists in reverse chronological order allows the efficient implementation of "before" and "after" operators, that is, a search that requests all documents that satisfy certain condition(s) "before" a certain time and/or "after" a certain time.

However, documents typically arrive in chronological order; thus, maintaining posting lists in reverse-chronological order means inserting items onto the front of lists. Inserting onto the front of a disk-based data structure is difficult since the data structures must be rewritten to accommodate new data. Moreover, because it is anticipated that other applications will co-exist with the content store, such as a PCDB, and associated software, the software running on a personal device must perform these rewriting activities during idle periods, and must be able to maintain reasonable performance even if this rewriting is deferred for long periods. The invention satisfies these requirements by using SDIs and MDIs collected together in an Index Set.

Single Document Indexes and Multiple Document Indexes

Figure 4:
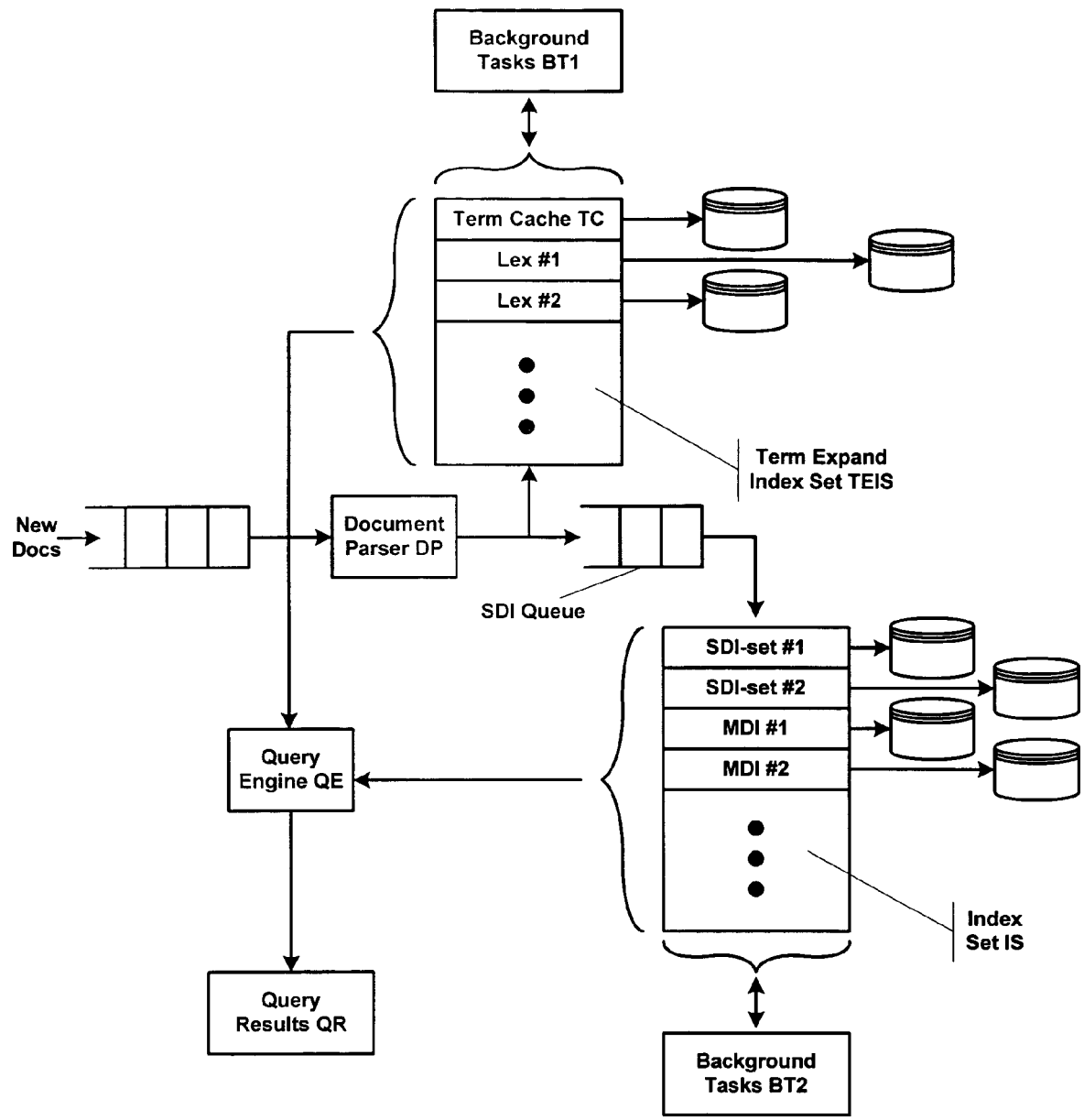
FIG. 4 is a block diagram of an exemplary non-limiting overall system for indexing and processing queries in accordance with the various embodiments of the invention.

The use of MDIs and SDIs along with other aspects of the invention such as the Term Expand Index in accordance with the invention can be understood in greater detail with reference to FIG. 4 illustrating various components of an exemplary overall system that can be used to achieve the objectives of the invention. Following the flow of data, documents enter on the left hand side ("New Docs") and are put on a first queue where the documents wait to be parsed. At a convenient moment, they are removed from this queue, a document parser DP is called and a parsed form of the document, called a Single Document Index ("SDI"), is placed in a second SDI queue. In addition, the document parser DP outputs a set of terms to be placed in a term expand index, represented in FIG. 4 as term expand index set TEIS. Again, at a convenient moment, SDIs are removed from the SDI queue and inserted into the index set IS. At this point, the document is available to be searched. Query Engine QE executes queries in consultation with the term expand index set TEIS and returns results based upon the reverse chronological indexing and posting list generation and comparison techniques described above.

It should be noted for definitional purposes, a document can be represented as a "forward representation" and a document can be represented as an "inverted representation." A document represented in forward form is the "regular" or non-inverted representation of the document. One way to understand "forward representations" of documents, therefore, is to contrast them to inverted representations.

For example, where a document collection is a three-column table where one column is "Doc ID," the second column is "position," and the third column is "term," consider the following document collection having two short documents:

1: Hi there
2: Good there

The three-column tabular representation of these two documents would be:

1 1 Hi
1 2 there
2 1 Good
2 2 there

It is noted that the "position" column is illustrates a more general case than embodiments illustrated herein that only have Doc ID and term are represented. For descriptive purposes, assume that the second column (position) is erased in this table because it is not needed.

A "forward" representation of this document collection is one that is sorted by Doc ID:

1 there
2 Good
2 there just as above without the second column. The inverted representation of the same document collection, in contrast, is sorted by term (inverted from forward representation):

2 Good
1 Hi
1 There
2 There

If this "inverted" listing is then translated into section based on terms, the following posting list results:

Good: 2
Hi: 1
There: 1 2

Thus, a posting list is an encoding of the inverted representation, and, under certain circumstances, the posting list is convenient for sorting as described variously herein and can be generated relatively quickly. Just as these encodings of the inverted representation can be well suited for certain search problems, similarly, there are "encodings" of the forward representation that are convenient for certain search problems, e.g., because they support fast scanning and/or they are compact. The fingerprint encoding described in connection with SDI collections below is one exemplary, non-limiting encoding of a forward representation.

In this regard, it is observed that a central data structure in the system, from which the above-described posting lists are formed, is the index set IS. In the embodiment of FIG. 4, the index set IS is a set of SDI collections (forward representations) and MDIs (inverted representations). As mentioned above, an SDI is an index for a single document (or Single Document Index); in one embodiment, an SDI comprises the terms that appear in the document, though it can be appreciated that a variety of forward representations are possible. In turn, an SDI collection is a collection of SDIs as a single structure. In contrast, a Multiple Document Index ("MDI") is an index for multiple documents and is an inverted representation of an SDI collection. Remaining consistent with the terminology described above with respect to generating posting lists in accordance with the invention, an MDI is a full-text index for a subset of the entire document collection being indexed.

In accordance with an embodiment of the invention, each document in the overall document collection is represented in exactly one of the SDI collections or one of the MDIs in the Index Set IS. New documents are inserted into one of the SDI collections. When an SDI collection becomes too large as a result, the SDI collection is inverted into an MDI. For instance, the invert policy may include inverting at a time when an SDI collection attains a pre-defined size relative to maximum storage space, e.g., half of the RAM size of the computing device. Over time, as there gets to be too many MDIs, two or more MDIs are merged into a larger MDI. The inversion and merging tasks are background tasks BT2, which are run at a "convenient time," which generally means at a time when the machine is idle. Since it is difficult to predict when a machine executing many concurrent processes will be idle, it is contemplated that there could be quite a few SDI collections and MDIs before background tasks BT2 are allowed to reorganize index set IS. However, because of the efficiencies garnered from using the query processing techniques of the invention are significant, i.e., query processing time is reasonably tolerant of this condition, thus giving the system of the invention a reasonable tolerance to unpredictable idle times.

Figure 5A:
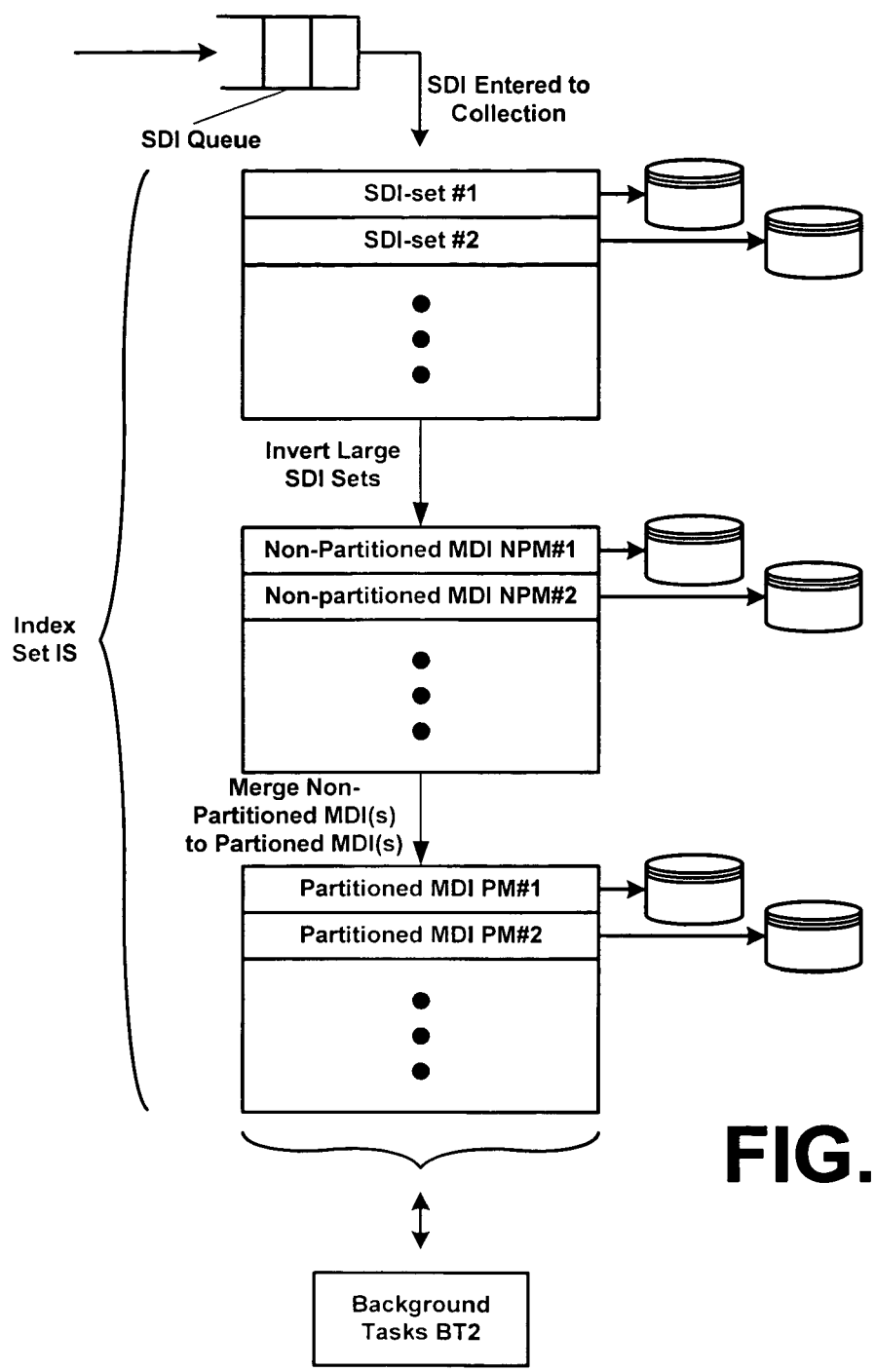
FIG. 5A is a block diagram illustrating exemplary aspects of an index set comprising multiple document indexes and single document index collections in accordance with various embodiments of the invention.

While many different methods for deciding when to merge MDIs can be used in accordance with the invention, one efficient way is illustrated in FIG. 5A. In FIG. 5A, two families of MDIs are maintained: a family of MDIs that are partitioned by date (PM#1, PM#2, etc.) and a family of MDIs that are not partitioned by date (NPM#1, NPM#2, etc.). An MDI is partitioned by date when it is assigned a date range for covering documents associated with the range. In one embodiment, the family of MDIs partitioned by date partition the timeline in a mutually exclusive fashion (i.e., no overlap). In a further embodiment, the family of MDIs partitioned by date partition the timeline in a mutually exclusive, jointly exhaustive fashion (exhaustive here means that the part of the timeline covered by all documents represented by the then current family of MDIs partitioned by date is exhausted), i.e., coverage of the full range of documents represented by the date partitioned MDIs should be guaranteed, but only by one MDI partition for any particular time. One way to achieve such a partitioning is to have one MDI per time period (e.g., per month, per quarter, or per year) at a granularity that makes sense for the application. Such granularity for date partitioned MDIs can be a dynamic or non-standard granularity as well. For instance, one partition may cover ten minutes and another may cover ten seconds, depending upon, for instance, the number of documents reflected for the time period covered, and as the characteristics of incoming documents change, so may the granularities associated with MDIs. Such granularity optimization calculations can be carried on as a background task, and carried out when convenient.

Figure 5B:
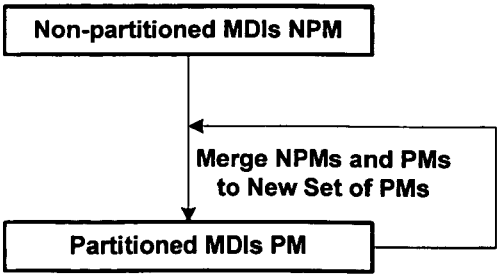
FIG. 5B illustrates an exemplary merge technique for partitioned and non-partitioned multiple document indexes in accordance with the invention.

In addition to these date-partitioned MDIs, as illustrated, there are also non-partitioned MDIs containing documents whose date ranges are unpredictable, so that there is a tolerance in the system for a subset of documents that are temporarily not efficiently indexed by date partition, but that nonetheless gain the efficiency from an MDI inverted representation (where comparatively speaking, the number of SDIs in an SDI collection grows too large). Generally, the dates of incoming documents cannot be controlled (e.g., the arrival rate of email documents generally cannot be predicted in advance), so partitioning that satisfies the conditions of mutual exclusivity and joint exhaustion cannot be guaranteed when SDIs are inverted. Thus, a good time to create the non-partitioned MDIs is when SDIs are inverted, and the non-partitioned MDIs can be merged into the partitioned MDIs when convenient as a background task BT2. The general case is illustrated in FIG. 5B, wherein a merge process is illustrated that takes non-partitioned MDIs NPM and partitioned MDIs PM as input, and merges them as a background task BT2 to form a new set of partitioned MDIs.

In this context, in one embodiment of the invention, the overall merging policy includes minimizing the number of non-partitioned MDIs in order to lead to the more efficient kind query processing of the invention that exploits temporal information efficiently (see below regarding query processing based on SDIs and MDIs). For example, for a partition that on its face does not satisfy a time requirement of a query, the partition may be skipped, quickly allowing the system to hone in on documents that are relevant to the date period associated with a query (e.g., between time1 and time2 queries, or "most recent" top-N type queries). A trickier part of the merge policy, however, is moving postings from the non-partitioned MDIs to the partitioned MDIs. If done too quickly, then an excessive amount of time will be spent rewriting largely unchanged data in the partitioned MDI. If it is not done quickly enough, then the non-partitioned MDI eventually grows too large, again causing unproductive effort during the merge process. Accordingly, based upon estimated heuristics and desirable usage patterns for an application, such as email, the invention draws a proper balance to provide optimal functionality to the user.

Term Expansion

As mentioned in connection with FIG. 4, the document parser DP outputs a set of terms to be placed in the term expand index set TEIS. In this regard, the invention further defines systems and methods for term expansion that are suitable for implementation on desktop/personal devices for interacting with content stores, such as PCDBs. In the vocabulary used herein, the terminology "term expansion" applies to the process of taking a term pattern and expanding it into a set of candidate terms. A term pattern is a pattern, or template, appearing in a query in which some characters of the term are provided but others are missing. During query processing, a term pattern is expanded into a set of candidate terms that match the pattern.

A commonly occurring form of term pattern is a prefix, in which the first characters of the term are provided, but the final characters are missing. Such a pattern is intended to match any term that begins the provided prefix. The prefix "budget," for example, would expand into term candidates such as "budget," "budgets," "budgeted," and "budgeting." Prefix patterns are particularly important for supporting "search-as-you-type" functionality, in which query results are returned as soon as the user starts typing, and those results are refined as the user types more and more characters, thereby eliminating candidate terms that no longer match the additional typed characters (e.g., autocomplete functionality). While prefix patterns are an important class of patterns, it can be appreciated that the invention, as described herein, is applicable more generally, supporting arbitrary regular expressions.

Figure 6A:
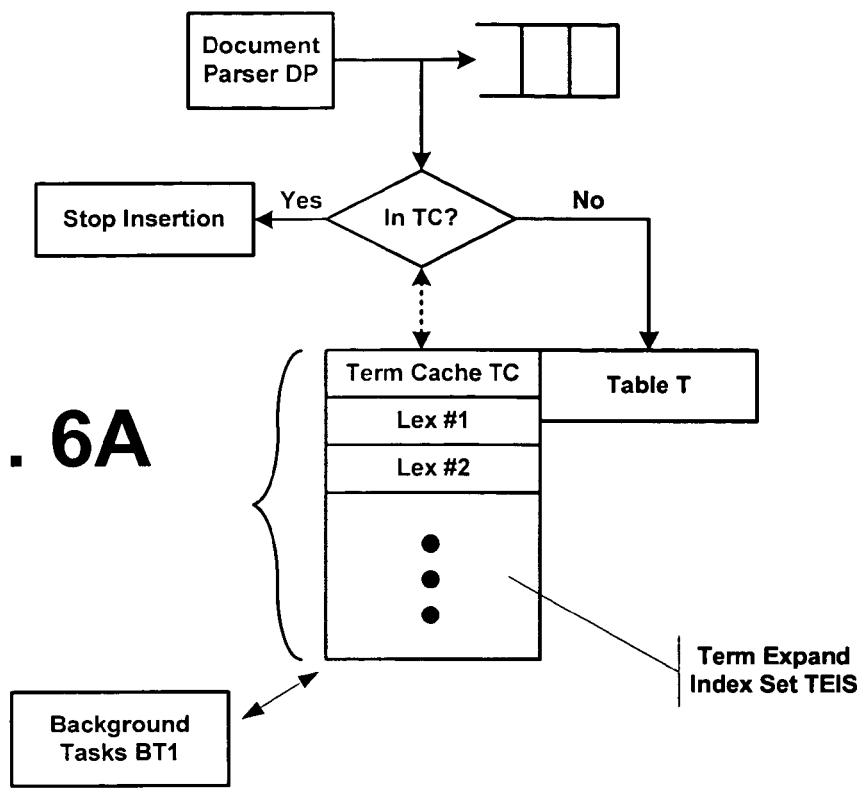
FIGS. 6A and 6B are block and flow diagrams, respectively, illustrating exemplary aspects of term expansion techniques applied in various embodiments of the present invention.

In further detail, as illustrated in FIG. 6A, the Term Expand Index (TEI) is responsible for expanding term patterns into a complete set of candidate terms. To do this, the TEI, such as TEIS, includes a list of all terms in the index (traditionally called a lexicon, or "lex" for short) and, so as not to introduce too much additional overhead at the front of the query process prior to submission of the query, the TEI of the invention may include a mechanism for accelerated searching of the TEI. In other exemplary embodiments, after all processing, the number of results returned by the TEI for a particular pattern is capped, or truncated, in order to limit the number of terms that we search for during query processing, finding a better balance between time and search exhaustion.

Figure 6B:
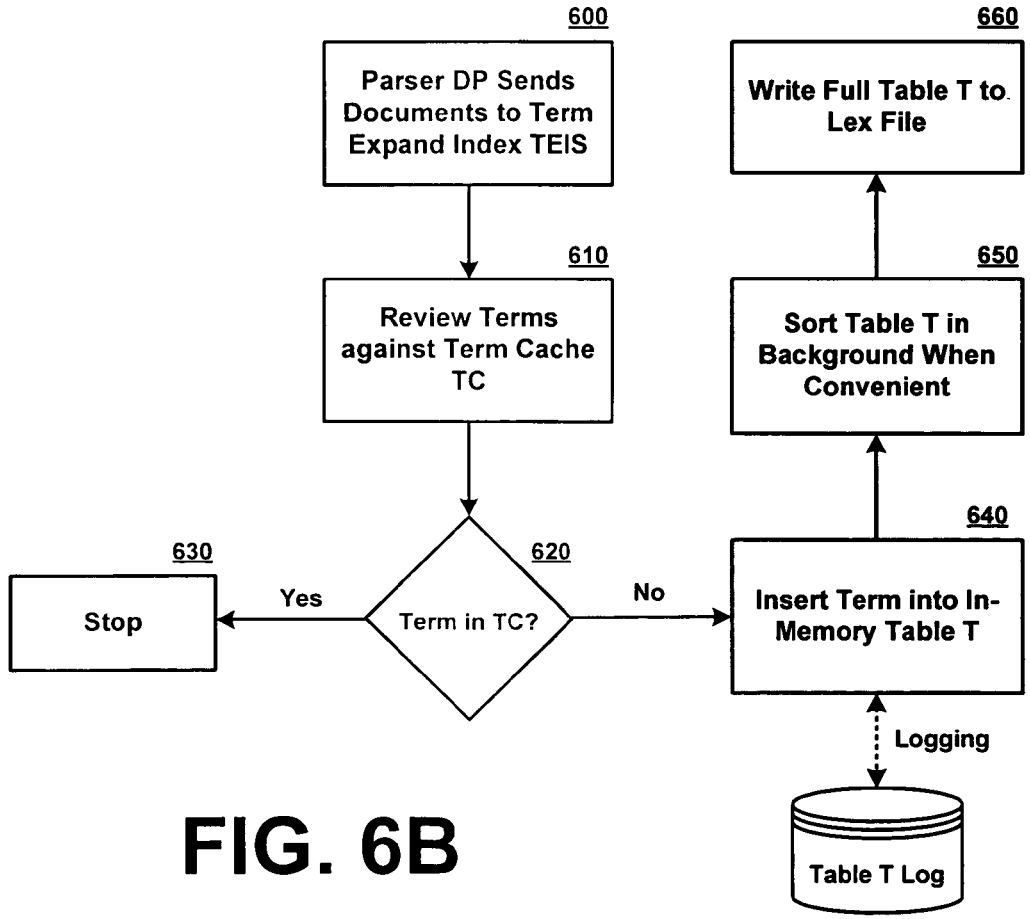

With further reference to FIG. 6A (depicting the relevant part of FIG. 4 in more detail) and the flow diagram of FIG. 6B, as documents are parsed, the parser DP sends terms to the TEIS at 600. The TEIS reviews a compact term cache TC at 610 to determine if the term is in any of the lexicon files Lex #1, Lex #2, etc. The term cache TC includes a relatively small number of frequently occurring terms. Then, at 620, a determination is made whether the term is in the term cache TC. If a term is in this term cache TC, the insertion process stops at 630, saving much time.

If the term is not in the term cache TC, the term is inserted into an in-memory table T of terms at 640, which can be logged to disk for crash-recovery. In various non-limiting embodiments of the term expand index TEI of the invention, after the tokenization process, the term expand index TEI discards a large number of tokens based on a filter. The filter is designed to remove any "junk" terms that tend bloat the index, slowing creation and searching. For instance, according to an exemplary non-limiting rule, the filter allows English words to pass. When the memory allocated for table T becomes full, at 650, a background task BT1 sorts table T and at 660, writes Table T out to a lexicon, or lex, file, which is a kind of collection of terms. As with MDIs, it is a goal to ensure that the number of lex files does not grow unbounded, so other background tasks BT1 occasionally merge or combine multiple lex files into a single lex file.

The particular format for collecting terms in a lex file, the decisions about which terms to include/exclude and the kinds of information tracked for lex files widely varies across systems. However, the above-described idea of decomposing the overall lex file into multiple lex files via a term index input mechanism such that the multiple lex files are later merged at the convenience of the system can apply to any lex file definition.

That being said, one instantiation of lex files optimized for personal search consistent with the goals of the invention is as follows. The lex files are kept sorted in alphabetical order. This alphabetical list is optionally broken into pages of prefixed size, e.g., hundreds to thousands of terms. These pages are then indexed by the first term on the page, allowing for fast implementation for prefix-pattern matching (via a search on the index).

In exemplary non-limiting embodiments of the invention, the Boyer-Moore-Horspool (BMH) algorithm was modified to support pattern matching in the term cache TC. BMH is a very fast string matching algorithm that enhances the performance of the cache.

The pages can further be indexed by the N-grams they contain, improving the speed of more general regular-expression matching, as discussed generally in N-gram Algorithm (Lee, Cho and Park, 1999), wherein an N-gram is described as a character sequence of length N extracted from a document. The main idea of the N-gram approach is that the character structure of a term can be used to find semantically similar terms. The approach assumes no prior linguistic knowledge about the text being processed. Moreover, there is no language specific information used in the N-grams approach, which qualifies this method as a language independent approach. By using N-grams, frequently appeared terms of each document can be extracted and compared to make the similarity measure.

In one aspect, by adding an initial TEI stage that buffers terms, this allows for offline updating of a longer term N-gram index. Essentially, processing queries can continue during maintenance of the TEI. As a result of maintaining the TEI in this fashion, there is a transactional context for the TEI that can be recorded, so that the TEI can rollback changes if there is an error.

While prefix compression is common in lexicons to reduce size, in one embodiment of the invention, prefix compression is also used to improve the performance of the N-gram analysis stage such that N-gram data from previous terms can be re-used to reduce the workload on the current term.

In further non-limiting embodiments of the invention, the TEI supports multiple N-gram sizes within a single index. Prior art systems disclose the use of a single N-gram size within a term expand index TEI, however, in embodiments of the invention, multiple N-gram key sizes are used within the TEI. This potentially boosts performance as larger N-grams can be used based on the input pattern. For instance, a* would use 2-grams, ab* can use 2-grams, but can also use 3-grams, and so on. In this regard, the higher the gram size, generally the better the performance.

Query Processing

Figure 7A:
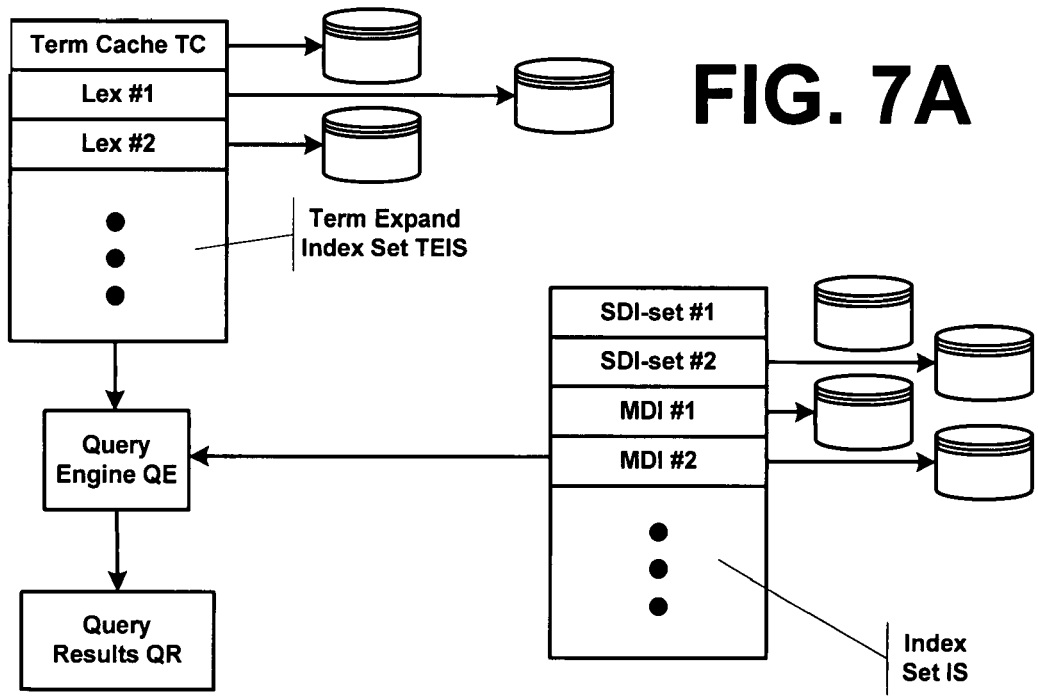
FIGS. 7A and 7B are block and flow diagrams, respectively, illustrating exemplary aspects of query processing based on the term expand index and the index set defined in accordance with the invention.

Now that the benefits of reverse-chronological posting lists, the structure of the Index Set IS and structure of the term expand index TEI of the invention have been described in various embodiments, the query processor, or query engine QE of the invention that uses the Index Set IS and TEI to generate query results will now be described, as re-illustrated in FIG. 7A as the relevant portion of FIG. 4.

Figure 7B:
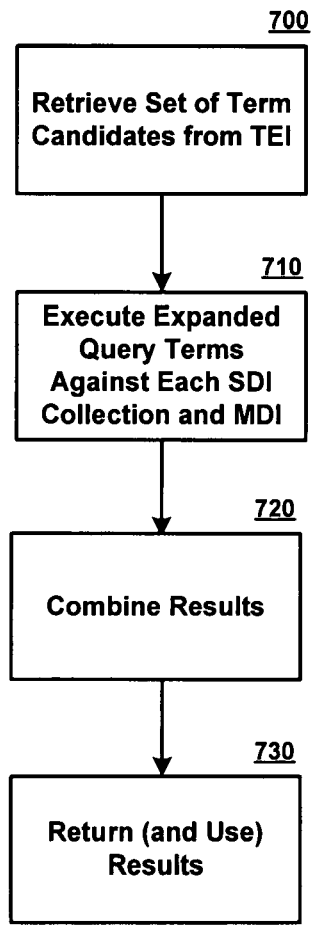

In various embodiments of query processing in accordance with the invention, a first step is to expand any term patterns in the query into a disjunction of term candidates. This is done by simply asking the TEI for the set of term candidates at 700, as illustrated in the flow diagram of FIG. 7B. After expansion, the query execution begins. At the top-level, query execution comprises running the query against each SDI collection and each MDI for each query term at 710, combining the results at 720 and delivering the results at 730 wherever appropriate for use. Running a query against an SDI collection in accordance with the invention comprises scanning the SDIs in the SDI collection.

When the number of SDIs is not too large, such scanning operation on the SDIs in the SDI collection is quite fast because an SDI efficiently represents a document in a non-inverted fashion by removing a lot of redundancy and superfluous information from a document, effectively providing a footprint of the document that can be quickly scanned for query terms. For instance, while any forward representation of a document is contemplated as an SDI in accordance with the invention, since any particular forward representation may be used to bias certain information as it pertains to a specialized application, such as email, an exemplary non-limiting hypothetical SDI that might be used removes spacing and formatting information in a document to efficiently represent the document in a compact fashion, e.g., a plain text file with text terms separated by some delimiter and including some additional metadata and fields as well. An SDI may thus be thought of as a compact forward representation of the document itself, which provides a fingerprint of the document that lends itself to an efficient scan of query term(s). In one embodiment, an SDI comprises a series of fingerprints, wherein instead of using compact representations of actual terms found in the document, signatures or fingerprints are used for an additional layer of compaction, i.e., the signatures or fingerprints provide more compact representation of the terms than a representation as text. A term maps deterministically and uniquely to a fingerprint, or signature, although a fingerprint may not necessarily map uniquely to a term.

Embodiments of the invention, however, can be tailored to more specific query search aims. For instance, in an email context, a lot of queries are "top-N" queries, which return the N-most recent documents satisfying the query criteria. It is beneficial from a resource conservation standpoint to short-circuit these queries, that is, terminate the query when it is known that any future results will not fall in the top-N. Thus, within SDIs, such short-circuiting can be achieved because the documents are maintained in reverse-chronological order. Specifically, after the first N documents satisfying the query are found, any further results will be further back in time than the top N. Hence, it is logically known that any further results will not be in the top N results and the query can be short-circuited.

Across MDIs, the same technique can be applied, i.e., if N documents satisfying the top-N query are already found, then searching any further MDIs becomes unnecessary. Further, MDIs are partially time-partitioned as suggested earlier, then that set can be efficiently searched in reverse-chronological order and once N documents are found, no further MDIs need be consulted, and the query results are combined and returned.

In one embodiment, the mechanics of query execution are as follows. To search an SDI collection, the query engine QE enumerates each document in the collection and searches it individually. While this is not unlike a full-document scan that is performed by indexless search implementations, the SDI data structure of the invention is designed to make scanning much faster than the case where raw document text is being scanned. To search an MDI, the query engine QE implements query compilation techniques described above, for example, taking the intersection of (reverse-chronologically ordered) posting lists where the query has an AND and taking the union of (reverse-chronologically ordered) posting lists where the query has an OR.

As mentioned above, when a content store having a high volume of content is frequently and unpredictably updated (documents added, deleted or modified) at a high transaction rate, returning the content that satisfies a query on the content in a quick, robust and efficient manner becomes a difficult problem. The problem compounds when the solution cannot be a dedicated one, i.e., when other processes must coexist and share computing resources with the solution. The invention as described above in the various systems and methods overcomes these problems, providing fast, efficient and scalable query execution and indexing models for a content store, such as a PCDB, and for searching and otherwise interacting with the content therein.

Bloom Filtering

A Bloom filter is a space-efficient probabilistic data structure that is used to test whether or not an element is a member of a set. False positives are possible, but false negatives are not. Elements can be added to the set, but not removed. The more elements that are added to the set, the larger the probability of false positives.

For example, one might use a Bloom filter to do spell-checking in a space-efficient way. A Bloom filter trained with a list of all correct words will accept all correct words and reject almost all incorrect words, which is good enough in some cases. One peculiar attribute of this spell-checker is that it is not possible to extract the list of correct words from it—at best, one can extract a list containing the correct words plus a significant number of false positives.

In this regard, there are various places in connection with the above-identified document indexing and query processing techniques where a bloom filter can be used to perform efficient operations. For instance, in one embodiment of the invention, a bloom filter is used when timestamp Doc IDs are assigned to documents in the system. As described above, one way of imposing a total order is to temporally order lists according to unique timestamp Doc IDs, and thus there needs to be a way of ensuring that a proposed timestamp is unique. With a bloom filter cache representing all of the timestamps, one can submit a new timestamp to the bloom filter, which quickly determines, with certainty, that the timestamp is not in the cache if the timestamp is in fact not in the cache. If this is the case, the timestamp may be used. If the bloom filter determines, however, that the timestamp is in the cache (without certainty, though with some probability), then the timestamp can be treated as if it is in conflict with another timestamp, and the procedures described above with respect to conflict resolution of timestamps can be applied. For instance, one further embodiment might randomly or predictively perturb the timestamp, and then iteratively resubmit the timestamp to the bloom filter until the bloom filter determines that the timestamp is not present (and thus can be used).

Bloom filters can also be used with respect to the scanning of SDIs when query processing in accordance with the invention. In this regard, because a scan operation of a forward representation with respect to a query term involves an inquiry into whether the query term is included, a bloom filter may be used in connection with such scanning. Thus, a bloom filter is applied for each SDI collection (any one or more of which may grow quite large in the background before the documents represented by the SDI collection are inverted to MDI form) such that if the bloom filter answers that the query term is not in the SDI collection, this becomes known with certainty quickly, saving much time, and the next SDI collection can be scanned. If, for any SDI collection, the answer returned by the bloom filter is that the query term may be inside, then a full scan can be performed to gain such certainty.

While some exemplary embodiments herein are described in connection with software residing on a computing device, one or more portions of the invention may also be implemented via an operating system, application programming interface (API) or a "middle man" object, hardware, firmware, such that a UI or mechanism for querying may be included in, supported in or accessed via any of a distributed computing framework's languages and services. There are thus multiple ways of implementing the present invention, e.g., an appropriate API, tool kit, driver code, operating system, standalone or downloadable software object, etc. which enables applications, nodes, devices and services to use the querying execution and indexing systems and methods according to the invention. The invention contemplates the use of the invention from the standpoint of an API (or other software object), as well as from a software or hardware object that communicates querying and associated document index information. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to search and retrieve information from a content store. Thus, the techniques for querying in accordance with the present invention may be applied to a variety of applications and devices. For instance, various implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention, and thus the invention should not be considered limited to any of the above-described software and/or hardware embodiments.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize or implement the mechanism(s), technique(s) and/or algorithm(s) of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine (such as an EPROM, a gate array, a programmable logic device (PLD), a client computer, a video recorder, a receiving machine having the signal or data processing capabilities, or the like, as described in exemplary embodiments above), the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices and models. Therefore, the present invention should not be limited to any single embodiment, but rather should be construed in breadth and scope in accordance with the appended claims.

What is claimed is:

1. A method for generating an index set for use in connection with the querying of documents in a content store, the method comprising:

updating said index set by storing in the index set a collection of single document indices that index terms from a set of documents, wherein each single document index of the collection of document indices indexes terms from a single document of the set of documents according to a position of the terms in the single document;

monitoring a size of the collection of single document indices;

detecting that the size of the collection has attained a specified size;

in response to detecting that the size of the collection has attained the specified size, generating a new multiple document index by converting a subset of the collection of single document indices to the new multiple document index, wherein:

the new multiple document index indexes terms from the subset, sorted by term; wherein the subset includes at least two single document indices that index terms from at least two single documents of the set of documents, and wherein the subset includes fewer than all single document indices;

wherein:

converting the subset to the new multiple document index causes the subset to be removed from the collection of single document indices;

each document in said content store is indexed by a single document index that indexes terms of the document if and only if the document is not indexed by a multiple document index that indexes terms of multiple documents;

the method is performed by one or more computing devices.

2. A method according to claim 1, wherein said collection of single document indices is ordered according to at least one ranking function.

3. A method according to claim 2, wherein the at least one ranking function includes a ranking function that ranks the single document indices according to times associated with single documents of the set of documents that are indexed by the single document indices.

4. A method according to claim 3, wherein the ranking function that ranks the single document indices according to times associated with the single documents of the set of documents ranks the single document indices in one of reverse chronological order or forward chronological order.

5. A method according to claim 3, wherein the at least one ranking function includes a ranking function that ranks the single document indices according to dates associated with the single documents of the set of documents.

6. A method according to claim 1, wherein said new multiple document index that indexes terms of the subset, sorted by term, includes at least (a) a first multiple document index that indexes terms from multiple documents, sorted by term, and is partitioned according to at least one ranking function, and (b) at least a second multiple document index that indexes terms from multiple other documents, sorted by term, and is not partitioned according to said at least one ranking function.

7. A method according to claim 6, wherein at least the first multiple document index is partitioned by time and at least the second multiple document index is not partitioned by time.

8. A method according to claim 7, wherein at least the first multiple document index is partitioned by date and at least the second multiple document index is not partitioned by date.

9. A method according to claim 7, wherein at least the first multiple document index is partitioned by time according to a dynamic granularity.

10. A method according to claim 1, further comprising:
storing at least one Bloom filter to be applied when scanning the collection of single document indices for at least one query term.

11. A method according to claim 1, wherein the collection of single document indices includes a series of fingerprints that correspond to terms in the set of documents, wherein each term maps uniquely to a fingerprint.

12. A method according to claim 1, further comprising:
detecting that one or more processors are idle;
wherein:
the step of generating is performed in response to detecting both that the size of the collection has attained the specified size and that one or more processors are idle.

13. A method according to claim 1, further comprising:
merging at least two multiple document indices that index terms of multiple documents, sorted by term, when the number of multiple document indices reaches or exceeds a specified number.

14. A method according to claim 13, wherein the merging includes merging said at least two multiple document indices as a background task that is allowed to proceed in response to detecting that one or more processors are idle.

15. A method according to claim 1, further comprising:
receiving a new document;
generating a single document index that indexes terms of only the new document; and
storing the single document index into the collection of single document indices that index terms of the set of documents.

16. A method according to claim 1, further comprising:
receiving a batch of new documents; and
processing the batch of new documents for storing in the index set as at least one of (A) at least one collection of single document indices that each indexes terms of a single document of the batch of new documents, or (B) at least one multiple document index that indexes terms of multiple documents of the batch of new documents, sorted by term, that occur in the multiple documents of the batch of new documents.

17. A method according to claim 1, wherein the specified size is a percentage relative to an available storage space, wherein the percentage is greater than zero and less than the entire available storage space.

18. A computer readable storage medium storing computer executable instructions for performing the method of claim 1.

19. An apparatus for generating an index set for use in connection with the querying of documents in a content store, the apparatus comprising:
one or more processors coupled to one or more storage devices;
wherein execution of one or more instructions stored on the one or more storage devices causes the one or more processors to perform:
updating said index set by storing in the index set a collection of single document indices that index terms from a set of documents, wherein each single document index of the collection of document indices indexes terms from a single document of the set of documents according to a position of the terms in the single document;
monitoring a size of the collection of single document indices;
detecting that the size of the collection has attained a specified size;
in response to detecting that the size of the collection has attained the specified size, generating a new multiple document index by converting a subset of the collection of single document indices to the new multiple document index, wherein:
the new multiple document index indexes terms from the subset, sorted by term; wherein the subset includes at least two single document indices that index terms from at least two single documents of the set of documents, and wherein the subset includes fewer than all single document indices;
wherein:
converting the subset to the new multiple document index causes the subset to be removed from the collection of single document indices;
each document in said content store is indexed by a single document index that indexes terms of the document if and only if the document is not indexed by a multiple document index that indexes terms of multiple documents.

20. A method for querying documents in a content store, the method comprising:
accessing an index set including:
a first plurality of single document indices that index terms of a first set of documents according to a position of the terms in the first set of documents, wherein each single document index of the first plurality of single document indices indexes terms of a single document of the first set of documents, and a second plurality of multiple document indices that index terms of a second set of documents, sorted by term, wherein each multiple document index of the second plurality of multiple document indices indexes terms of multiple documents of the second set of documents;

wherein each multiple document index of the second plurality of multiple document indices is generated by converting a subset of a collection of single document indices when a size of the collection of single document indices reaches a specified size;

receiving at least one query term for processing against said index set;

scanning the first plurality of single document indices for said at least one query term and retrieving a first set of document identifiers for documents that satisfy the at least one query term; and querying against the second plurality of multiple document indices with said at least one query term and retrieving a second set of document identifiers for documents that satisfy the at least one query term;

wherein each document in said content store is indexed by a single document index in the first plurality of single document indices if and only if the document is not indexed by a multiple document index in the second plurality of multiple document indices;

wherein the method is performed by one or more computing devices.

21. A method according to claim 20, further comprising: terminating said scanning without said querying if said first set of document identifiers completely satisfies the at least one query term.

22. A method according to claim 20, further comprising: terminating said querying when said first set of document identifiers and said second set of document identifiers completely satisfy the at least one query term.

23. A method according to claim 20, wherein said first set of document identifiers are sorted according to a ranking function as a result of said first plurality of single document indices representing documents sorted according to the same ranking function.

24. A method according to claim 23, wherein said first set of document identifiers are sorted according to reverse chronological order as a result of said first plurality of single document indices representing documents according to reverse chronological order.

25. A method according to claim 20, wherein said first set of document identifiers include at least one of (A) document identifiers that are sorted according to a ranking function as a result of the first plurality of single document indices representing documents sorted according to the same ranking function or (B) document identifiers that are not sorted according to the ranking function as a result of the first plurality of single document indices not representing documents sorted according to the ranking function.

26. A method according to claim 25, wherein said first set of document identifiers include document identifiers that are sorted according to time.

27. A method according to claim 26, wherein said first set of document identifiers include document identifiers that are sorted in reverse chronological order.

28. A method according to claim 23, wherein for each query term, said first and second sets of document identifiers are combined to form a posting list sorted according to the ranking function.

29. A method according to claim 28, wherein for each query term, said first and second sets of document identifiers are combined to form a posting list sorted according to reverse chronological order.

30. A method according to claim 20, wherein scanning includes scanning a series of fingerprints of the first plurality of single document indices, wherein the series of fingerprints corresponds to terms in the first set of documents, wherein each term maps uniquely to a fingerprint.

31. A method according to claim 20, wherein said scanning the first plurality of single document indices for said at least one query term includes first applying a Bloom filter to determine whether a query term condition is not satisfied by said first plurality of single document indices.

32. A method according to claim 20, further comprising:
monitoring a size of the first plurality of single document indices;

in response to detecting that the size of the first plurality of single document indices has attained the specified size, generating a new multiple document index in the second plurality of multiple document indices by converting a subset of the first plurality of single document indices to the new multiple document index, wherein the new multiple document index indexes terms from the subset, sorted by term;

wherein the subset includes at least two single document indices that index terms from at least two single documents of the first set of documents, and wherein the subset includes fewer than all of the first plurality of single document indices.

33. A method according to claim 32, wherein the specified size is a percentage relative to an available storage space, wherein the percentage is greater than zero and less than the entire available storage space.

34. A computer readable storage medium storing computer executable instructions for performing the method of claim 20.

35. An apparatus for querying documents in a content store, the apparatus comprising:
one or more processors coupled to one or more storage devices;

wherein execution of one or more instructions stored on the one or more storage devices causes the one or more processors to perform:

accessing an index set including:
a first plurality of single document indices that index terms of a first set of documents according to a position of the terms in the first set of documents, wherein each single document index of the first plurality of single document indices indexes text of a single document of the first set of documents, and a second plurality of multiple document indices that index terms of a second set of documents, sorted by term, wherein each multiple document index of the second plurality of multiple document indices indexes terms of multiple documents of the second set of documents;

wherein each multiple document index of the second plurality of multiple document indices is generated by converting a subset of a collection of single document indices when a size of the collection of single document indices reaches a specified size;

receiving at least one query term for processing against said index set;

scanning the first plurality of single document indices for said at least one query term and retrieving a first set of document identifiers for documents that satisfy the at least one query term; and querying against the second plurality of multiple document indices with said at least one query term and retrieving a second set of document identifiers for documents that satisfy the at least one query term;

wherein each document in said content store is indexed by a single document index in the first plurality of single document indices if and only if the document is not indexed by a multiple document index in the second plurality of multiple document indices.

* * * * *